(12) United States Patent
Goodman

(10) Patent No.: US 9,426,193 B2
(45) Date of Patent: Aug. 23, 2016

(54) MULTI-DIMENSIONAL DATA VISUALIZATION, NAVIGATION, AND MENU SYSTEMS

(71) Applicant: GravityNav, Inc., San Francisco, CA (US)

(72) Inventor: Jay Goodman, San Francisco, CA (US)

(73) Assignee: GRAVITYNAV, INC., San Francisco, CA (US)

( * ) Notice: Subject to any disclaimer, the term of this patent is extended or adjusted under 35 U.S.C. 154(b) by 0 days.

(21) Appl. No.: 14/732,591

(22) Filed: Jun. 5, 2015

(65) Prior Publication Data
US 2016/0105475 A1    Apr. 14, 2016

Related U.S. Application Data

(60) Provisional application No. 62/063,871, filed on Oct. 14, 2014.

(51) Int. Cl.
| | |
|---|---|
| G06F 3/0485 | (2013.01) |
| H04L 29/06 | (2006.01) |
| G06F 3/0482 | (2013.01) |
| G06F 3/0488 | (2013.01) |
| G06F 3/033 | (2013.01) |
| G06F 3/01 | (2006.01) |
| G06F 3/0484 | (2013.01) |

(52) U.S. Cl.
CPC .............. *H04L 65/403* (2013.01); *G06F 3/016* (2013.01); *G06F 3/033* (2013.01); *G06F 3/0482* (2013.01); *G06F 3/0485* (2013.01); *G06F 3/0488* (2013.01); *G06F 3/04842* (2013.01)

(58) Field of Classification Search
CPC ...... G06F 3/04842; G06F 3/016; G06F 3/033
USPC ........................................................ 715/753
See application file for complete search history.

(56) References Cited

U.S. PATENT DOCUMENTS

| | | | |
|---|---|---|---|
| 8,704,879 B1 | 4/2014 | Cheng et al. | |
| 2007/0028270 A1* | 2/2007 | Ostojic | H04N 5/44543 725/53 |
| 2007/0073719 A1 | 3/2007 | Ramer et al. | |
| 2009/0079823 A1* | 3/2009 | Bellamy | G08B 13/19656 348/143 |
| 2009/0303204 A1* | 12/2009 | Nasiri | A63F 13/06 345/184 |

(Continued)

FOREIGN PATENT DOCUMENTS

| | | |
|---|---|---|
| WO | WO 03/001340 | 1/2003 |
| WO | WO-2006022770 A1 | 3/2006 |

OTHER PUBLICATIONS

PCT Patent Application No. PCT/US2015/055597 International Search Report and Written Opinion dated Jan. 26, 2016.

*Primary Examiner* — Jennifer To
*Assistant Examiner* — Ashley Fortino
(74) *Attorney, Agent, or Firm* — Wilson Sonsini Goodrich & Rosati

(57) ABSTRACT

Described herein are systems, media, and methods for providing an application that receives information for a plurality of items and utilizes the information to generate a navigable multi-dimensional list of items, wherein the list of items is navigable by at least three navigation modes comprising touch scroll and rotation, joystick scroll and rotation, gyroscopic scroll and rotation. As such, the application allows a user to efficiently and effectively visualize, navigate, create, and share large amounts of data.

30 Claims, 14 Drawing Sheets

(56) References Cited

U.S. PATENT DOCUMENTS

| | | | |
|---|---|---|---|
| 2010/0057645 A1* | 3/2010 | Lauritsen | G06N 5/042 706/11 |
| 2011/0179368 A1 | 7/2011 | King et al. | |
| 2012/0038750 A1 | 2/2012 | Lim | |
| 2012/0203733 A1* | 8/2012 | Zhang | G06Q 50/01 707/600 |
| 2013/0227478 A1 | 8/2013 | Rydenhag et al. | |
| 2013/0257718 A1 | 10/2013 | Oejelund et al. | |

* cited by examiner

Fig. 4
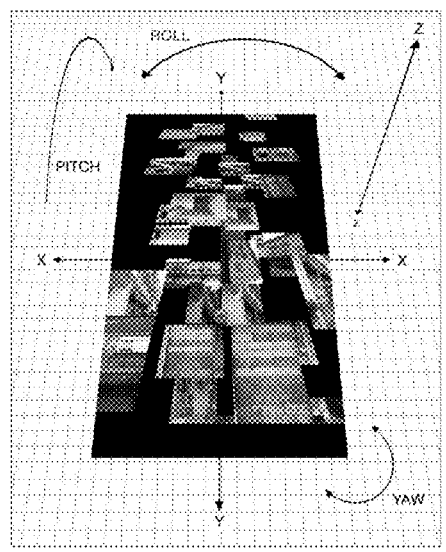
A
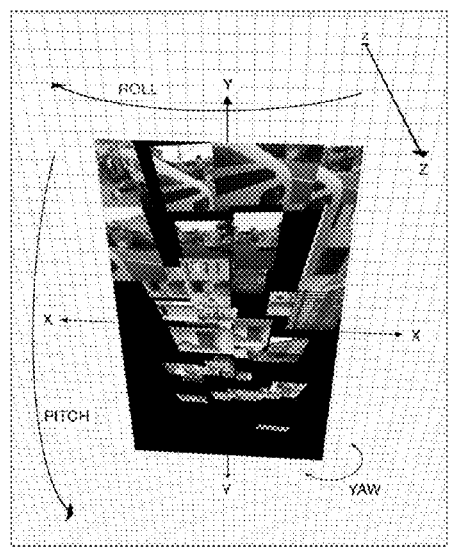
B
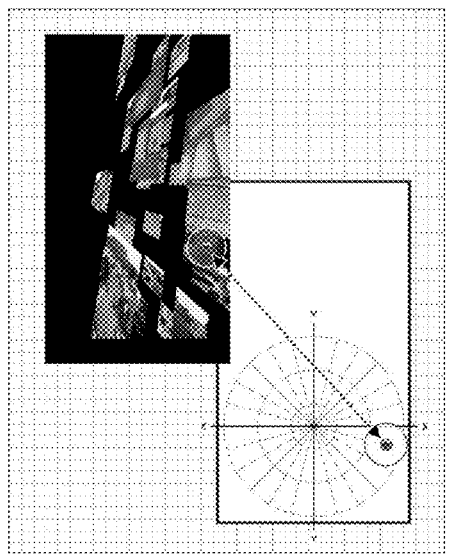
C
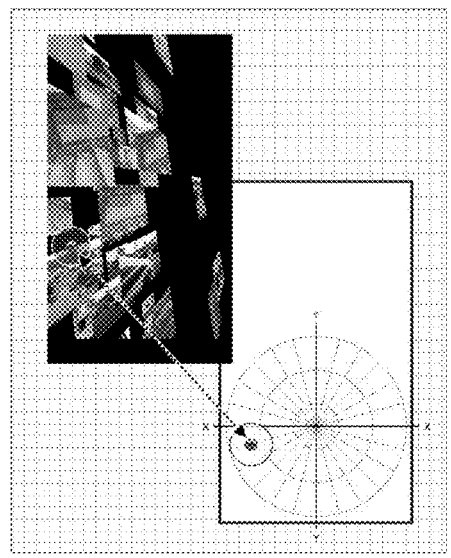
D

Fig. 5
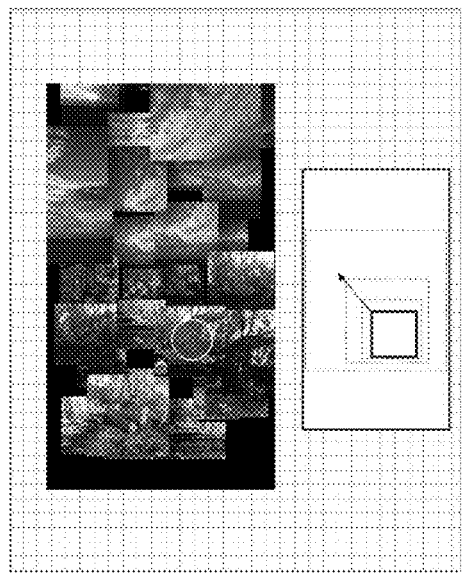
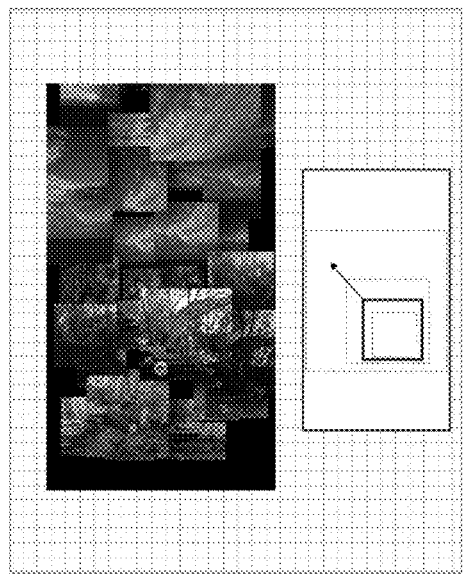
A B
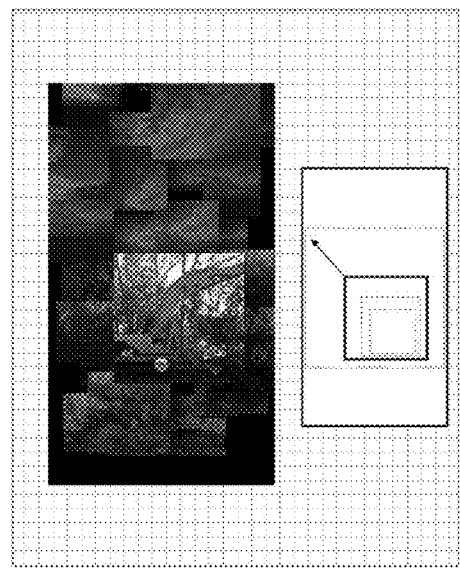
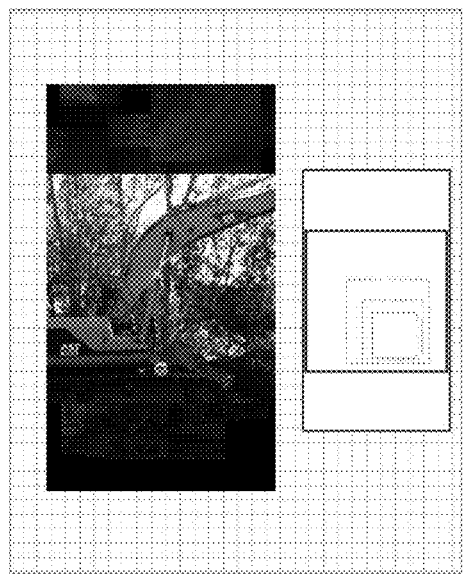
C D

Fig. 7
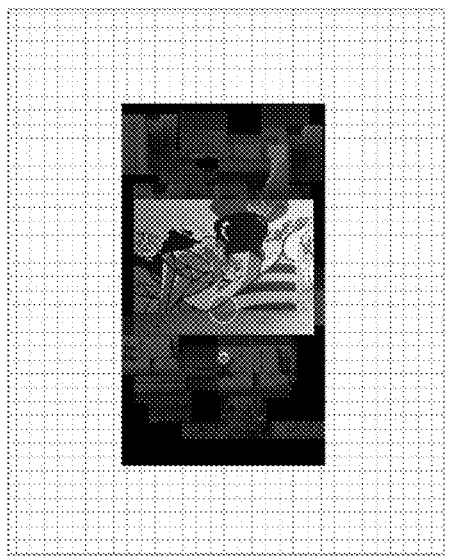
A
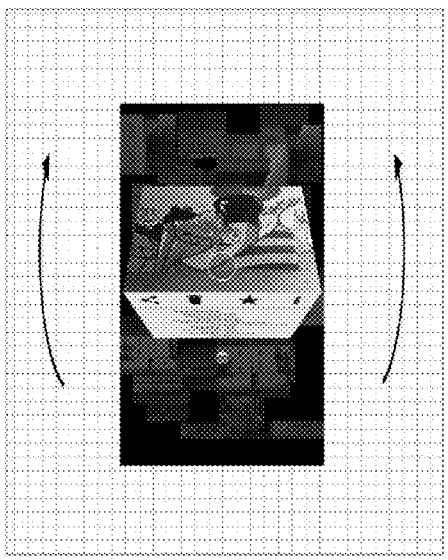
B
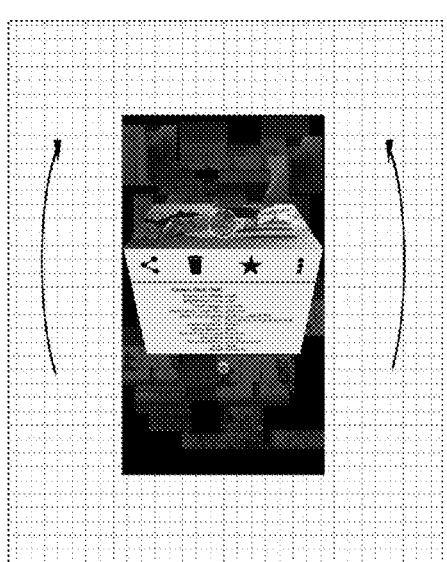
C
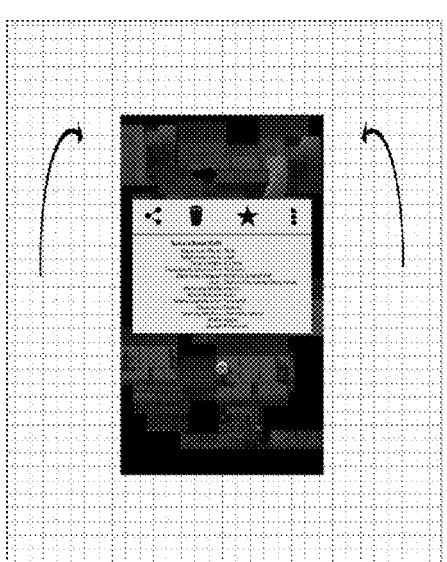
D

Fig. 9
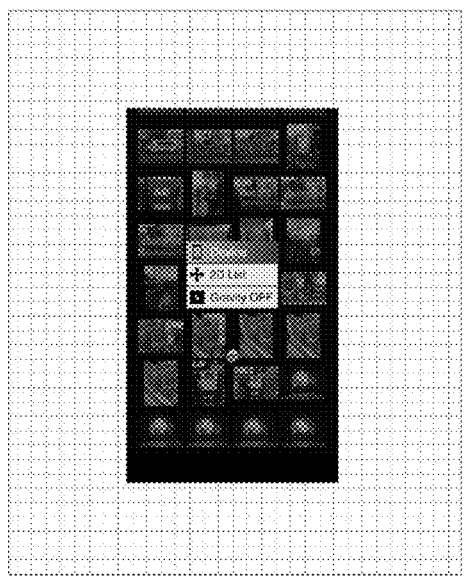
A
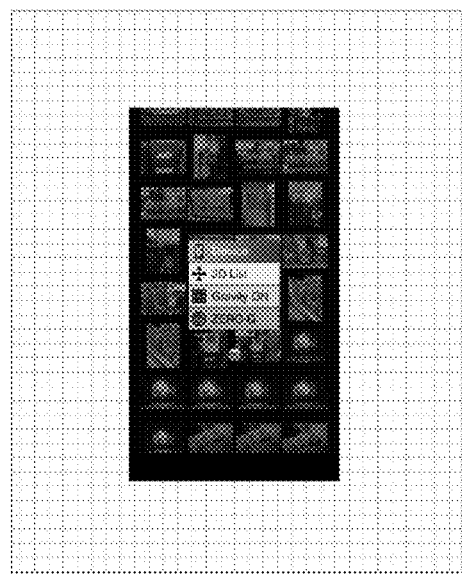
B
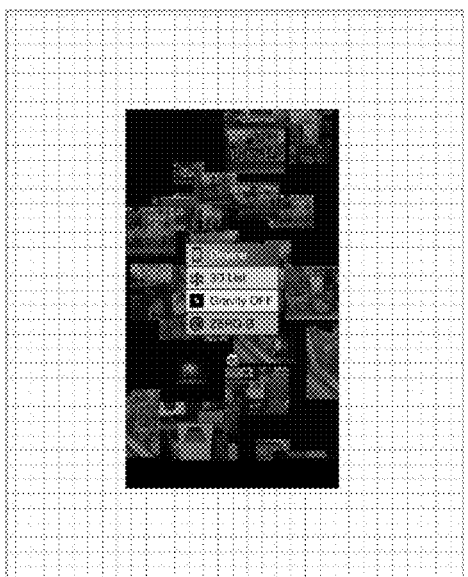
C
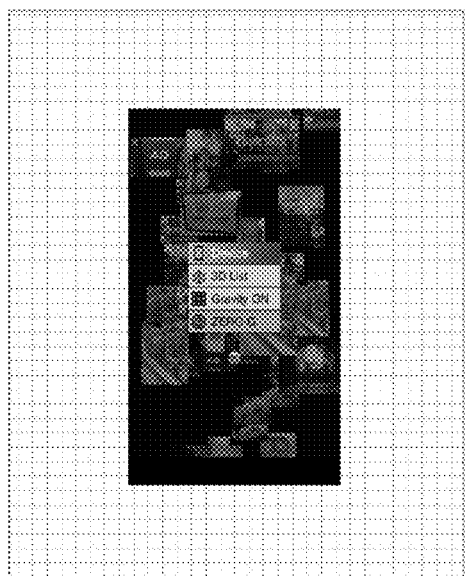
D

Fig. 13
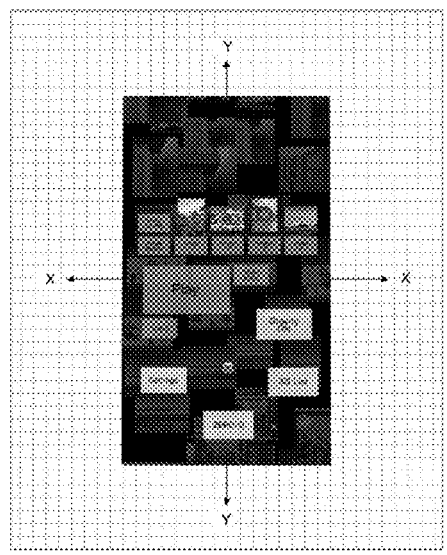
A
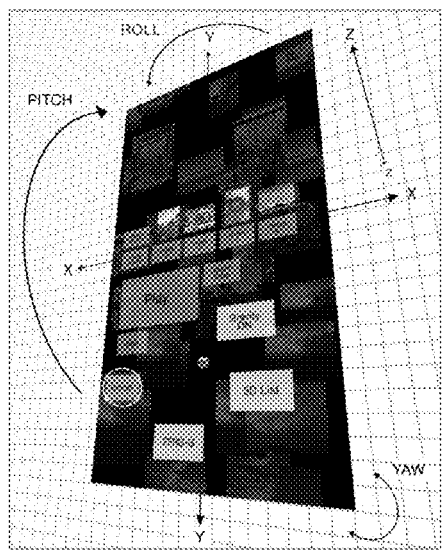
B
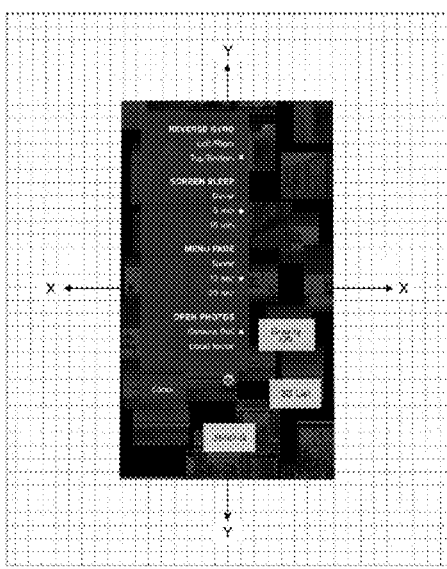
C
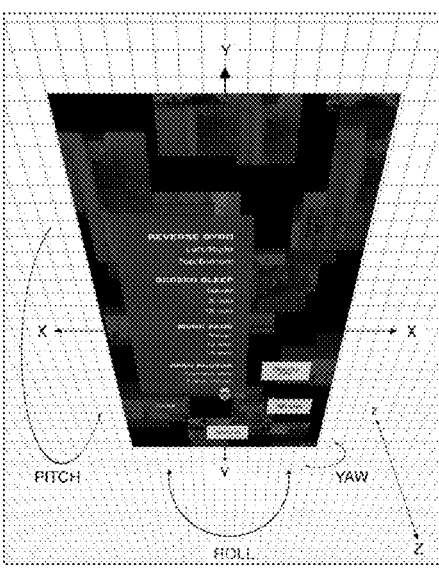
D

Fig. 14
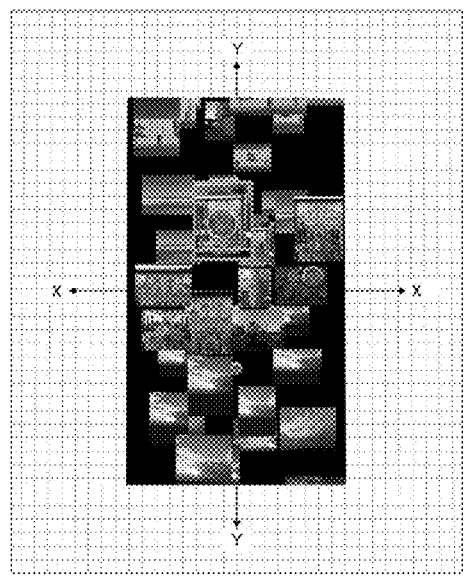
A
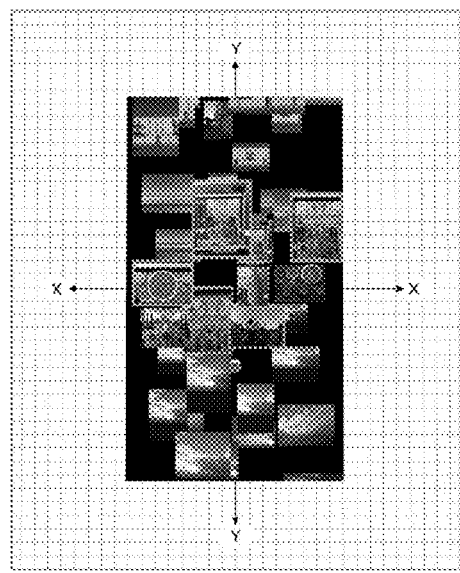
B
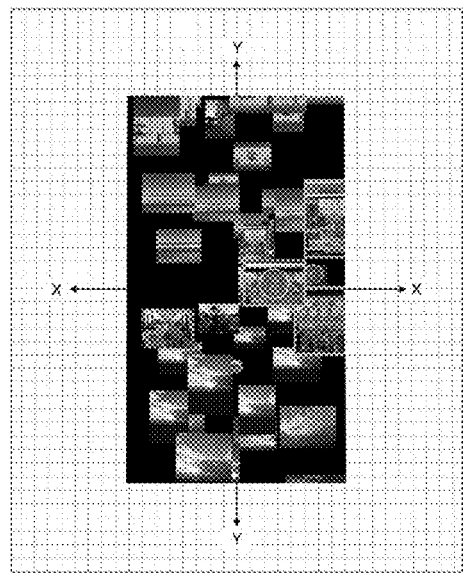
C
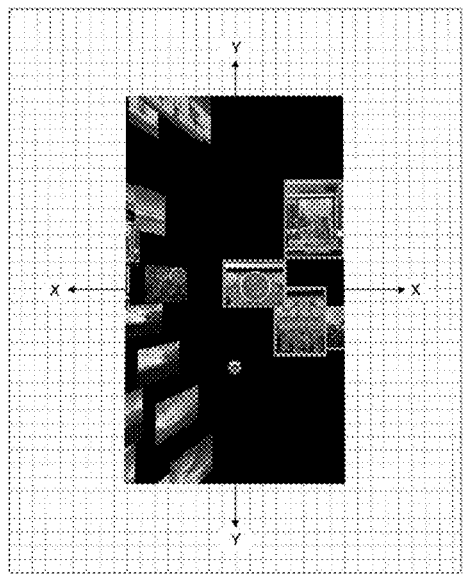
D

MULTI-DIMENSIONAL DATA VISUALIZATION, NAVIGATION, AND MENU SYSTEMS

CROSS-REFERENCE TO RELATED APPLICATIONS

This application claims the benefit of U.S. Application Ser. No. 62/063,871, filed Oct. 14, 2014, which is herein incorporated by reference in its entirety.

BACKGROUND OF THE INVENTION

With the increasing availability of electronic communication and mobile computing, users need more efficient mechanisms to visualize, navigate, create, and share large amounts of visual information.

SUMMARY OF THE INVENTION

Described herein are data visualization applications for viewing and navigating items on a computer device or cloud-based service. In some embodiments, the data is arranged as a multi-dimensionally stacked vertical list moving within a multi-dimensional environment. In particular embodiments, the data is arranged as a three-dimensionally stacked vertical list moving within a three-dimensional environment. The list is optionally navigated using touch, joystick, and/or gyroscopically controlled gestures. In further embodiments, the list is optionally navigated using eye and/or head tracking. The navigation includes moving the list up and down (y-axis) left and right (x-axis) and forward and back (z-axis). The navigation gestures simultaneously control yaw, pitch, and roll of the list.

The systems, media, and methods disclosed herein provide an intuitive multi-dimensional way to access features and functions within a contained section of the screen with limited need for extended finger dexterity. The menu system efficiently displays multiple selections within a contained space that would normally require more screen real-estate to display similar quantities of menu items. The contained menu system also reduces the need for two handed operation or phone in hand repositioning (i.e., resting the phones against your stomach to reposition hand position or tossing the phone in your hand).

By designing the menus with multi-dimensional facets, users will have a spatial context awareness of how the menu items are being organized. Color coding will also allow the user contextual based organizational layouts for quickly accessing features and functions by visually grouping items. Accordingly, the systems, media, and methods disclosed herein provide a solution for efficient and dynamic display systems for navigating through vast amounts of visual information, including files and folders, with intuitive gesture based controls.

The data within the list is optionally sourced from a local device as well incorporating the option to source data from one or more web-based and cloud services. The data is displayed in a unified list for viewing. The data is displayed based on user-selected criteria to help navigate, find, and collect data. The subject matter described herein provides a dynamic, engaging, and entertaining way to search, save, and share lists of information with others.

In one aspect, disclosed herein are computer-implemented system comprising: a processing device comprising a gyroscope, an operating system configured to perform executable instructions, and a memory; a computer program including instructions executable by the digital processing device to create an application comprising: a software module configured to receive information for a plurality of items; a software module configured to utilize the information to generate a navigable multi-dimensional list of items; the items in the list of items arranged in the X-axis and Y-axis based on a sorting factor and the items in the list of items further arranged in the Z-axis; provided that the list of items is navigable by at least three navigation modes comprising touch scroll and rotation, joystick scroll and rotation, gyroscopic scroll and rotation; wherein, in response to a first user interaction, the Z-axis position of a selected item is arranged to the front and the list of items presents an isolated enlarged version of the selected item; wherein, in response to a second user interaction, the list of items presents item details and item options for the selected item; and a software module configured to present a joystick graphical user interface element, the joystick graphical user interface element being modal with a first mode wherein the joystick allows the user to display an administrative menu and a second mode wherein the joystick allows the user to navigate the list of items by scrolling through the list in the y-axis and to manipulate the list itself with yaw, pitch, and roll controls. In some embodiments, the items comprise document files, media files, applications, icons, links, bookmarks, communications (e.g., text messages, social media posts and/or comments, blog posts and/or comments, microblog posts and/or comments, calls, voice mails, emails, and the like), contacts or folders, archives, or compilations of the same. In further embodiments, the media files comprise photos, videos, sound files, music files, live video streams, live audio streams, or e-books. In some embodiments, the sorting factor is alphabet, chronology, location, people, file type, color, or other metadata. In some embodiments, the items in the list of items are randomly arranged in the Z-axis. In other embodiments, the items in the list of items are hierarchically arranged in the Z-axis. In further embodiments, the items in the list of items are hierarchically arranged in the Z-axis based on the sorting factor or another factor. In some embodiments, the software module configured to receive information for a plurality of items presents an interface allowing the user to select one or more sources for the items or a list of items. In further embodiments, the source is the local storage of the processing device. In other embodiments, the source is a remote service. In further embodiments, the remote service is a cloud computing-based service. In various embodiments, the remote service is Facebook, Instagram, Twitter, Vine, Pinterest, Tumblr, LinkedIn, Dropbox, Box, Flickr, Google Drive, iCloud, Youtube, Vimeo, SkyDrive, Mega, Hightail, Imgur, Photobucket, Picasa, Reddit, 4Chan, GitHub, WhatsApp, Viber, Line, WeChat, Paper, FlipBoard, Gmail, Yahoo Mail, iCloud Mail, Facebook Messenger, Outlook, Aol Mail, Mail.com, Uber, Lyft, or Ello. In some embodiments, the touch scroll and rotation comprises the user interacting with a touchscreen of processing device through drag and flick gestures applied to the list of items to vertically scroll the list and horizontally rotate the list. In some embodiments, the joystick scroll and rotation comprises the user interacting with a touchscreen of processing device to manipulate a graphical joystick element to vertically scroll the list and horizontally rotate the list's rotational yaw, pitch, and roll in multi-dimensional space revealing surfaces of geometric menus as well as gyroscope controls. In some embodiments, the gyroscopic scroll and rotation comprises the user manually rotating the processing device to vertically scroll the list and manipulate the list in yaw, pitch, and roll orientations. In other embodiments, the navigation modes further comprise eye tracking scroll and rotation, wherein the user vertically scrolls the list and horizontally rotates the list via eye movements. In yet other embodiments, the navigation modes further comprise head tracking scroll and rotation, wherein the user vertically scrolls the list and horizontally rotates the list via head movements. In yet other embodiments, the navigation modes further comprise hand gesture tracking scroll and rotation, wherein the user vertically scrolls the list and horizontally rotates the list via hand gestures. In some embodiments, the navigation modes provide a parallaxed dimensional display of the elements within the list. In some embodiments, the item options comprise share, delete, add to a secondary list, apply a visual effect or look, and apply audio. In some embodiments, the item details comprise text and data associated with the item. In further embodiments, the item details comprise metadata. In still further embodiments, the metadata comprises EXIF data. In some embodiments, the first user interaction is selected from the group consisting of: tap, double-tap, long hold, push, pull, flick, swipe, on an item in the list of items, and combinations thereof. In some embodiments, the second user interaction is selected from the group consisting of: a gyro-gesture (e.g., gyroscopically-detected yaw, pitch, and/or roll), a touchscreen gesture, and combinations thereof. In some embodiments, the administrative menu is displayed on a three-dimensional geometric object. In other embodiments, the administrative menu is displayed on a plurality of three-dimensional objects, the objects manipulable in three-dimensions as a single unit. In some embodiments, the joystick, in the second mode, further allows the user to reset the calibration point of the gyroscope of the processing device. In some embodiments, the processing device is a mobile device and the application is a mobile application. In some embodiments, the application further comprises a software module configured to allow a user to select one or more items from the list of items and to associate the selected items to form a collection. In further embodiments, the collection is collaborative and is shared with at least one other user who can edit the collection. In still further embodiments, the application further comprises a software module configured to export a video file comprising a slideshow or animation of the collection. In some embodiments, the application further comprises a software module configured to export a video file comprising screen capture video of a user interacting with the application. In some embodiments, the navigable multi-dimensional list of items is user-configurable to provide audio or haptic user feedback.

In another aspect, disclosed herein are non-transitory computer-readable storage media encoded with a computer program including instructions executable by a processor to create an application comprising: a software module configured to receive information for a plurality of items; a software module configured to utilize the information to generate a navigable multi-dimensional list of items; the items in the list of items arranged in the X-axis and Y-axis based on a sorting factor and the items in the list of items further arranged in the Z-axis; provided that the list of items is navigable by at least three navigation modes comprising touch scroll and rotation, joystick scroll and rotation, gyroscopic scroll and rotation; wherein, in response to a first user interaction, the Z-axis position of a selected item is arranged to the front and the list of items presents an isolated enlarged version of the selected item; wherein, in response to a second user interaction, the list of items presents item details and item options for the selected item; and a software module configured to present a joystick graphical user interface element, the joystick graphical user interface element being modal with a first mode wherein the joystick allows the user to display an administrative menu and a second mode wherein the joystick allows the user to navigate the list of items with yaw, pitch, and roll controls. In some embodiments, the items comprise document files, media files, applications, icons, links, bookmarks, communications (e.g., text messages, social media posts and/or comments, blog posts and/or comments, microblog posts and/or comments, calls, voice mails, emails, and the like), contacts or folders, archives, or compilations of the same. In further embodiments, the media files comprise photos, videos, sound files, music files, live video streams, live audio streams, or e-books. In some embodiments, the sorting factor is alphabet, chronology, location, people, file type, color, or other metadata. In some embodiments, the items in the list of items are randomly arranged in the Z-axis. In other embodiments, the items in the list of items are hierarchically arranged in the Z-axis. In further embodiments, the items in the list of items are hierarchically arranged in the Z-axis based on the sorting factor or another factor. In some embodiments, the software module configured to receive information for a plurality of items presents an interface allowing the user to select one or more sources for the items or a list of items. In further embodiments, the source is the local storage of the processing device. In other embodiments, the source is a remote service. In further embodiments, the remote service is a cloud computing-based service. In various embodiments, the remote service is Facebook, Instagram, Twitter, Vine, Pinterest, Tumblr, LinkedIn, Dropbox, Box, Flickr, Google Drive, iCloud, Youtube, Vimeo, SkyDrive, Mega, Hightail, Imgur, Photobucket, Picasa, Reddit, 4Chan, GitHub, WhatsApp, Viber, Line, WeChat, Paper, FlipBoard, Gmail, Yahoo Mail, iCloud Mail, Facebook Messenger, Outlook, Aol Mail, Mail.com, Uber, Lyft, or Ello. In some embodiments, the touch scroll and rotation comprises the user interacting with a touchscreen of processing device through drag and flick gestures applied to the list of items to vertically scroll the list and horizontally rotate the list. In some embodiments, the joystick scroll and rotation comprises the user interacting with a touchscreen of processing device to manipulate a graphical joystick element to vertically scroll the list and horizontally rotate the list. In some embodiments, the gyroscopic scroll and rotation comprises the user manually rotating the processing device to vertically scroll the list and manipulate the list in yaw, pitch, and roll orientations. In other embodiments, the navigation modes further comprise eye tracking scroll and rotation, wherein the user vertically scrolls the list and horizontally rotates the list via eye movements. In yet other embodiments, the navigation modes further comprise head tracking scroll and rotation, wherein the user vertically scrolls the list and horizontally rotates the list via head movements. In yet other embodiments, the navigation modes further comprise hand gesture tracking scroll and rotation, wherein the user vertically scrolls the list and horizontally rotates the list via hand gestures. In some embodiments, the navigation modes provide a parallaxed dimensional display of the elements within the list. In some embodiments, the item options comprise share, delete, add to a secondary list, apply a visual effect or look, and apply audio. In some embodiments, the item details comprise text and data associated with the item. In further embodiments, the item details comprise metadata. In still further embodiments, the metadata comprises EXIF data. In some embodiments, the first user interaction is selected from the group consisting of: tap, double-tap, long hold, push, pull, flick, swipe, on an item in the list of items, and combinations thereof. In some embodiments, the second user interaction is selected from the group consisting of: a gyro-gesture (e.g., gyroscopically-detected yaw, pitch, and/or roll), a touchscreen gesture, and combinations thereof. In some embodiments, the administrative menu is displayed on a multi-dimensional geometric object, such as a three-dimensional object. In other embodiments, the administrative menu is displayed on a plurality of multi-dimensional objects, the objects manipulable in multiple dimensions as a single unit. In some embodiments, the joystick, in the second mode, further allows the user to reset the calibration point of the gyroscope of the processing device. In some embodiments, the processing device is a mobile device and the application is a mobile application. In some embodiments, the application further comprises a software module configured to allow a user to select one or more items from the list of items and to associate the selected items to form a collection. In further embodiments, the collection is collaborative and is shared with at least one other user who can edit the collection. In still further embodiments, the application further comprises a software module configured to export a video file comprising a slideshow or animation of the collection, with or without audio. In some embodiments, the application further comprises a software module configured to export a video file comprising screen capture video of a user interacting with the application. In some embodiments, the navigable multi-dimensional list of items is user-configurable to provide audio or haptic user feedback.

In another aspect, disclosed herein are computer-implemented methods for visualizing and navigating a menu system comprising: receiving, by a computer, information for a plurality of items; utilizing, by the computer, the information to generate a navigable multi-dimensional list of items; the items in the list of items arranged in the X-axis and Y-axis based on a sorting factor and the items in the list of items further arranged in the Z-axis; provided that the list of items is navigable by at least three navigation modes comprising touch scroll and rotation, joystick scroll and rotation, gyroscopic scroll and rotation; presenting, by the computer, in response to a first user interaction, an isolated enlarged version of a selected item, wherein the Z-axis position of the selected item is arranged to the front of the list of items; presenting, by the computer, in response to a second user interaction, item details and item options for the selected item; and presenting, by the computer, a joystick graphical user interface element, the joystick graphical user interface element being modal with a first mode wherein the joystick allows the user to display an administrative menu and a second mode wherein the joystick allows the user to navigate the list of items with yaw, pitch, and roll controls. In some embodiments, the items comprise document files, media files, applications, icons, links, bookmarks, communications (e.g., text messages, social media posts and/or comments, blog posts and/or comments, microblog posts and/or comments, calls, voice mails, emails, and the like), contacts or folders, archives, or compilations of the same. In further embodiments, the media files comprise photos, videos, sound files, music files, live video streams, live audio streams, or e-books. In some embodiments, the sorting factor is alphabet, chronology, location, people, file type, color, or other metadata. In some embodiments, the items in the list of items are randomly arranged in the Z-axis. In other embodiments, the items in the list of items are hierarchically arranged in the Z-axis. In further embodiments, the items in the list of items are hierarchically arranged in the Z-axis based on the sorting factor or another factor. In some embodiments, the software module configured to receive information for a plurality of items presents an interface allowing the user to select one or more sources for the items or a list of items. In further embodiments, the source is the local storage of the processing device. In other embodiments, the source is a remote service. In further embodiments, the remote service is a cloud computing-based service. In various embodiments, the remote service is Facebook, Instagram, Twitter, Vine, Pinterest, Tumblr, LinkedIn, Dropbox, Box, Flickr, Google Drive, iCloud, Youtube, Vimeo, SkyDrive, Mega, Hightail, Imgur, Photobucket, Picasa, Reddit, 4Chan, GitHub, WhatsApp, Viber, Line, WeChat, Paper, FlipBoard, Gmail, Yahoo Mail, iCloud Mail, Facebook Messenger, Outlook, Aol Mail, Mail.com, Uber, Lyft, or Ello. In some embodiments, the touch scroll and rotation comprises the user interacting with a touchscreen of processing device through drag and flick gestures applied to the list of items to vertically scroll the list and horizontally rotate the list. In some embodiments, the joystick scroll and rotation comprises the user interacting with a touchscreen of processing device to manipulate a graphical joystick element to vertically scroll the list and horizontally rotate the list. In some embodiments, the gyroscopic scroll and rotation comprises the user manually rotating the processing device to vertically scroll the list and manipulate the list in yaw, pitch, and roll orientations. In other embodiments, the navigation modes further comprise eye tracking scroll and rotation, wherein the user vertically scrolls the list and horizontally rotates the list via eye movements. In yet other embodiments, the navigation modes further comprise head tracking scroll and rotation, wherein the user vertically scrolls the list and horizontally rotates the list via head movements. In yet other embodiments, the navigation modes further comprise hand gesture tracking scroll and rotation, wherein the user vertically scrolls the list and horizontally rotates the list via hand gestures. In some embodiments, the navigation modes provide a parallaxed dimensional display of the elements within the list. In some embodiments, the item options comprise share, delete, add to a secondary list, apply a visual effect or look, and apply audio. In some embodiments, the item details comprise text and data associated with the item. In further embodiments, the item details comprise metadata. In still further embodiments, the metadata comprises EXIF data. In some embodiments, the first user interaction is selected from the group consisting of: tap, double-tap, long hold, push, pull, flick, swipe, on an item in the list of items, and combinations thereof. In some embodiments, the second user interaction is selected from the group consisting of: a gyro-gesture (e.g., gyroscopically-detected yaw, pitch, and/or roll), a touchscreen gesture, and combinations thereof. In some embodiments, the administrative menu is displayed on a three-dimensional geometric object. In other embodiments, the administrative menu is displayed on a plurality of three-dimensional objects, the objects manipulable in three-dimensions as a single unit. In some embodiments, the joystick, in the second mode, further allows the user to reset the calibration point of the gyroscope of the processing device. In some embodiments, the processing device is a mobile device and the application is a mobile application. In some embodiments, the application further comprises a software module configured to allow a user to select one or more items from the list of items and to associate the selected items to form a collection. In further embodiments, the collection is collaborative and is shared with at least one other user who can edit the collection. In still further embodiments, the application further comprises a software module configured to export a video file comprising a slideshow or animation of the collection. In some embodiments, the application further comprises a software module configured to export a video file comprising screen capture video of a user interacting with the application. In some embodiments, the navigable multi-dimensional list of items is user-configurable to provide audio or haptic user feedback.

BRIEF DESCRIPTION OF THE DRAWINGS

FIG. 4 shows a non-limiting example of a navigable, three-dimensional list of items; in this case, a list demonstrating gyroscopically-controlled vertical scrolling of the items (A: user pitching device up; B: user pitching device down) and horizontal rotation of the list (C and D) via a touch-based joystick user interface element.

FIG. 5 shows a non-limiting example of a navigable, three-dimensional list of items; in this case, a list (A) offering the ability to present an isolated and enlarged version of a selected item (B, C, and D).

FIG. 7 shows a non-limiting example of a navigable, three-dimensional list of items; in this case, a list offering a geometric menu presenting the item in a first surface and presenting item details and feature functions on a second surface in response to a first user interaction with a selected item, which causes the geometric menu to rotate to reveal the item details (A-D).

FIG. 9 shows a non-limiting example of an administrative menu; in this case, an administrative menu allowing configuration of the source of the items in the list, 2D (A and B) or 3D presentation (C and D) of the items, gravity off (A and C) or on (B and D), and re-zeroing the pivot point for the gravity effect optionally used for gyroscopic scroll and rotation.

FIG. 13 shows the administrative menu of FIG. 12 wherein a "view" button toggles to a "play" button, displaying sub-menu playback options (A and B) and a "settings" button displays sub-menu settings options (C and D).

FIG. 14 shows a non-limiting example of a mechanism for selecting one or more items in the list of items (A and B) and isolating the selected items to form a collection (C and D).

DETAILED DESCRIPTION OF THE INVENTION

Figure 1:
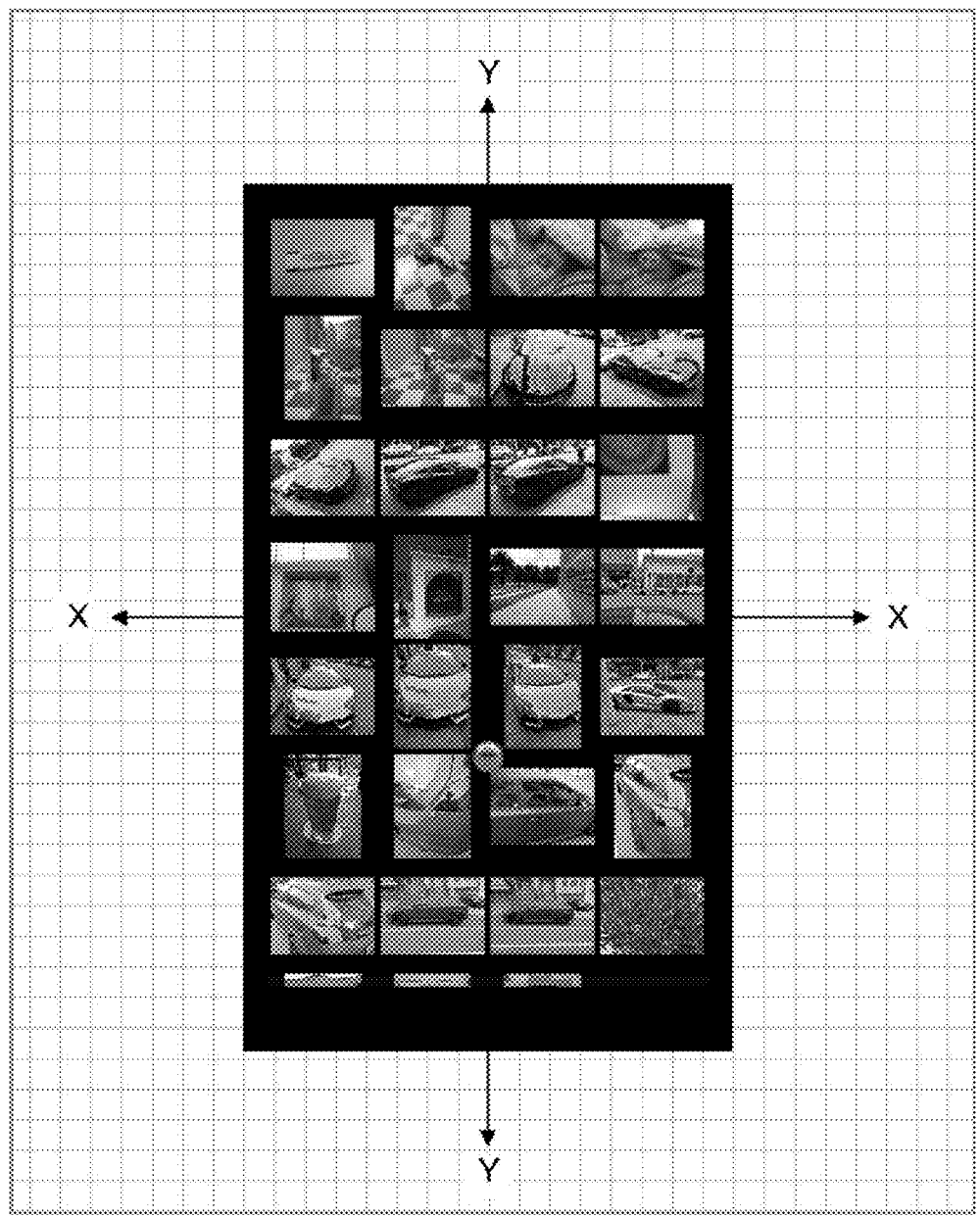
FIG. 1 shows a non-limiting example of a navigable, two-dimensional list of items; in this case, a list of photos.

Described herein, in certain embodiments, are computer-implemented system comprising: a processing device comprising a gyroscope, an operating system configured to perform executable instructions, and a memory; a computer program including instructions executable by the digital processing device to create an application comprising: a software module configured to receive information for a plurality of items; a software module configured to utilize the information to generate a navigable multi-dimensional list of items; the items in the list of items arranged in the X-axis and Y-axis based on a sorting factor and the items in the list of items further arranged in the Z-axis; provided that the list of items is navigable by at least three navigation modes comprising touch scroll and rotation, joystick scroll and rotation, gyroscopic scroll and rotation; wherein, in response to a first user interaction, the Z-axis position of a selected item is arranged to the front and the list of items presents an isolated enlarged version of the selected item; wherein, in response to a second user interaction, the list of items presents item details and item options for the selected item; and a software module configured to present a joystick graphical user interface element, the joystick graphical user interface element being modal with a first mode wherein the joystick allows the user to display an administrative menu and a second mode wherein the joystick allows the user to navigate the list of items with yaw, pitch, and roll controls.

Also described herein, in certain embodiments, are non-transitory computer-readable storage media encoded with a computer program including instructions executable by a processor to create an application comprising: a software module configured to receive information for a plurality of items; a software module configured to utilize the information to generate a navigable multi-dimensional list of items; the items in the list of items arranged in the X-axis and Y-axis based on a sorting factor and the items in the list of items further arranged in the Z-axis; provided that the list of items is navigable by at least three navigation modes comprising touch scroll and rotation, joystick scroll and rotation, gyroscopic scroll and rotation; wherein, in response to a first user interaction, the Z-axis position of a selected item is arranged to the front and the list of items presents an isolated enlarged version of the selected item; wherein, in response to a second user interaction, the list of items presents item details and item options for the selected item; and a software module configured to present a joystick graphical user interface element, the joystick graphical user interface element being modal with a first mode wherein the joystick allows the user to display an administrative menu and a second mode wherein the joystick allows the user to navigate the list of items with yaw, pitch, and roll controls.

Also described herein, in certain embodiments, are computer-implemented methods for visualizing and navigating a menu system comprising: receiving, by a computer, information for a plurality of items; utilizing, by the computer, the information to generate a navigable multi-dimensional list of items; the items in the list of items arranged in the X-axis and Y-axis based on a sorting factor and the items in the list of items further arranged in the Z-axis; provided that the list of items is navigable by at least three navigation modes comprising touch scroll and rotation, joystick scroll and rotation, gyroscopic scroll and rotation; presenting, by the computer, in response to a first user interaction, an isolated enlarged version of a selected item, wherein the Z-axis position of the selected item is arranged to the front of the list of items; presenting, by the computer, in response to a second user interaction, item details and item options for the selected item; and presenting, by the computer, a joystick graphical user interface element, the joystick graphical user interface element being modal with a first mode wherein the joystick allows the user to display an administrative menu and a second mode wherein the joystick allows the user to navigate the list of items with yaw, pitch, and roll controls.

CERTAIN DEFINITIONS

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein in some embodiments, "parallaxed" refers to a displacement or difference in the apparent position of an object viewed along two different lines of sight, and is measured by the angle or semi-angle of inclination between those two lines. For example, as a viewpoint moves side to side, objects in the distance appear to move slower than the objects close to the viewpoint.

As used herein in some embodiments, "joystick" refers to a user input control capable of receiving user input indicating a direction and a distance from a fixed point.

Plurality of Items

In some embodiments, the systems, media, and methods disclosed herein include plurality of items, which are presented in an interface allowing visualization and navigation of the items via one of a plurality of navigational modes. Many types of items are suitable. In some embodiments, suitable items include files, folders, archives, and compilations, including combinations thereof. In further embodiments, suitable items include text, documents, e-books, audio (e.g., sound files, music files, etc.), images (e.g., photographs, illustrations, etc.), videos, multimedia (e.g., interactive elements, games, etc.), streams (e.g., live video streams, live audio streams, etc.), and applications, including combinations thereof. In some embodiments, suitable items include electronic communications such as, text messages, social media posts and/or comments, blog posts and/or comments, microblog posts and/or comments, calls and voice mails, and emails, including combinations thereof. In some embodiments, suitable items include links, bookmarks, and websites, including combinations thereof. In some embodiments, suitable items include contacts.

Many text formats are suitable including, by way of non-limiting examples, Rich Text Format (RTF), TXT, ASCII, UTF-8, and HTML formatted text. Many document formats are suitable including, by way of non-limiting examples, Microsoft® Office Word®, Microsoft® Office PowerPoint®, Microsoft® Office Excel®, DocBook, HTML, OpenDocument, PalmDoc, Portable Document Format (PDF), Rich Text Format (RTF), and WordPerfect.

Many e-book formats are suitable including, by way of non-limiting examples, plain text, hypertext markup language (HTML), Amazon® Kindle™, Open Electronic Package, TomeRaider, Arghos Diffusion, Flip Books, ANSI/NISO Z39.86 (DAISY), FictionBook, Text Encoding Initiative, Plucker, Compressed HM, Portable Document Format, PostScript, DjVu, Microsoft LIT, eReader, Desktop Author, Newton eBook, Founder Electronics, Libris, Mobipocket, EPUB, Broadband eBooks (BBeB), SSReader, TealDoc, IEC 62448, and Comic Book Archive file. Suitable e-books include those formatted for viewing on, by way of non-limiting examples, Apple® iPad®, Amazon® Kindle™, Barnes & Noble Nook™, Sony® Reader™, iRex iLiad, the Jinke Hanlin eReader, Bookeen CyBook, Endless Ideas BeBook, and the Kobo™ eReader.

Many audio formats are suitable including, by way of non-limiting examples, MP3, WAV, AIFF, AU, Apple® Lossless, MPEG-4, Windows Media®, Vorbis, AAC, and Real Audio®.

Many raster image formats are suitable including, by way of non-limiting examples, Joint Photographic Experts Group (JPEG), JPEG 2000, Exchangeable image file format (EXIF), Tagged Image File Format (TIFF), RAW, Portable Network Graphics (PNG), Graphics Interchange Format (GIF), Windows® bitmap (BMP), portable pixmap (PPM), portable graymap (PGM), portable bitmap file format (PBM), wireless bitmap (WBMP), and WebP. In some embodiments, images are uncompressed (e.g., RAW format). In other embodiments, images are compressed. Both lossy and lossless image CODECs are suitable. Many vector image formats are suitable including, by way of non-limiting examples, CGM and SWF. Both two-dimensional and three-dimensional vector images are suitable.

Many video formats are suitable including, by way of non-limiting examples, Windows® Media Video (WMV), Windows® Media®, Motion Picture Experts Group (MPEG), Audio Video Interleave (AVI), Apple® QuickTime®, RealMedia®, Flash Video, Motion JPEG (M-JPEG), WebM, Advanced Video Coding High Definition (AVCHD), Ogg Video, Vob, MV4, MP4, 3GPP, 3GPP2, and the like. In some embodiments, video is uncompressed (e.g., RAW format). In other embodiments, video is compressed. Both lossy and lossless video CODECs are suitable including, by way of non-limiting examples, DivX™, Cineform, Cinepak, Dirac, DV, FFV1, H.263, H.264, H.264 lossless, JPEG 2000, MPEG-1, MPEG-2, MPEG-4, On2 Technologies (VPS, VP6, VP7, and VP8), RealVideo, Snow lossless, Sorenson Video, Theora, and Windows Media Video (WMV).

In some embodiments, image and/or video media are standard-definition. In other embodiments, image and/or video media are high-definition or ultra-high-definition. In further embodiments, a high-definition image or video frame includes at least about 1280×about 720 pixels or at least about 1920×about 1080 pixels. In further embodiments, ultra high-definition video is 4K UHD (2160 p), 8K UHD (4320 p), or higher resolution. In some embodiments, video media are 360-degree video.

Many multimedia formats are suitable including, by way of non-limiting examples, Adobe® Flash®, Apple® QuickTime®, Microsoft® Silverlight®, Java™, HTML 5, XHTML 5, and Unity®.

List of Items

In some embodiments, the systems, media, and methods disclosed herein include a navigable list of items. In further embodiments, the items are electronic files and/or folders or representations thereof. As described herein, many types of electronic items are suitable. In various embodiments, the list of items is used to browse, navigate, and select individual items in the list of items. Exemplary contemplated uses include previewing, viewing, and browsing visual media such as photographs, recorded videos, and video streams, previewing, listening, and browsing audio media such as recorded sound files, recorded songs, and audio streams, browsing and selecting applications in an operating environment, viewing and selecting options in an application environment, browsing contacts, browsing communications, and the like.

In some embodiments, the list of items is a two-dimensional list of items. In cases utilizing a two-dimensional list, the items are arranged in the X and Y axes relative to each other, for example, in a linear list configuration or an X and Y coordinate grid configuration. In further embodiments, a two-dimensional list of items is navigable by a user traversing the items in the X and Y coordinates via any of the navigation modes described herein.

In some embodiments, the list of items is a three-dimensional list of items. In cases utilizing a three-dimensional list, the items are arranged in the X, Y, and Z axes relative to each other, for example, in a three-dimensional array configuration. In further embodiments, a three-dimensional list of items is navigable by a user traversing the items in the X and Y coordinates and manipulating the list itself in multi-dimensional space via any of the navigation modes described herein.

In some embodiments, the items in the list of items are arranged, relative to each other, randomly. In other embodiments, the items in the list of items are arranged, relative to each other, based at least in part on a sorting factor. In various embodiments, the items are arranged in the X, Y, and/or Z axis based at least in part on a sorting factor. Suitable sorting factors include characteristics of the item. For example, suitable item-based sorting factors include alphabetical (e.g., based on file name, author, etc.), chronology (e.g., based on creation date, last modification date, etc.), location (e.g., location created, location last modified, etc.), or file type. Suitable sorting factors also include metadata associated with the item. Suitable sorting factors also include characteristics of the subject matter of the item. For example, suitable subject matter-based sorting factors include alphabetical, chronology, location, color, and people (e.g., individuals appearing in the subject matter). Suitable sorting factors also include preferences and/or behaviors of the user. For example, suitable user-based sorting factors include preference, favorite status, date last selected, number of times selected, etc.

In some embodiments, wherein the items are playable electronic items or representations thereof, such as video files, video streams, audio files, audio streams, animations, multimedia, interactive elements, and the like, the items include a preview. In further embodiments, the previews are gyroscopically-controlled. For example, in a particular embodiment, pitching or rolling the device plays a video forward or backwards at variable speeds depending on the degree of rotation of the device.

Referring to FIG. 1, in a particular embodiment, a list of items is a two-dimensional list of photograph files. In this embodiment, the photographs are optionally arranged horizontally and vertically, relative to each other, into a grid configuration. Further, in this embodiment, the photographs are displayed in the list as thumbnail preview representations.

Figure 2:
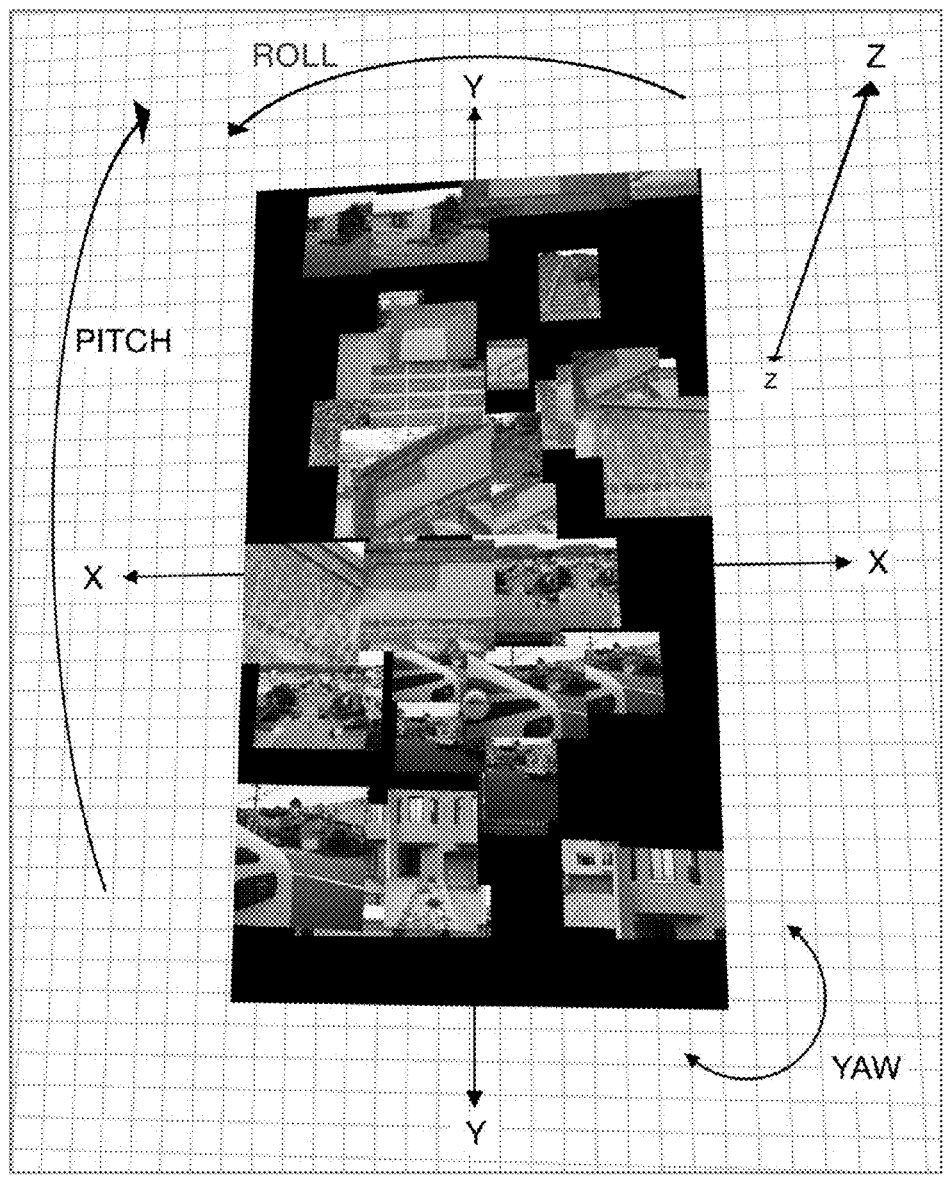
FIG. 2 shows a non-limiting example of a navigable, three-dimensional list of items; in this case, a list of photos wherein the user is pitching the device "up" and rolling "left" to navigate the list.

Referring to FIG. 2, in a particular embodiment, a list of items is a three-dimensional list of photograph files. In this embodiment, the photographs are optionally arranged horizontally, vertically, and in Z-space, relative to each other, into an array configuration. Further, in this embodiment, the photographs are displayed in the list as thumbnail preview representations.

Figure 3:
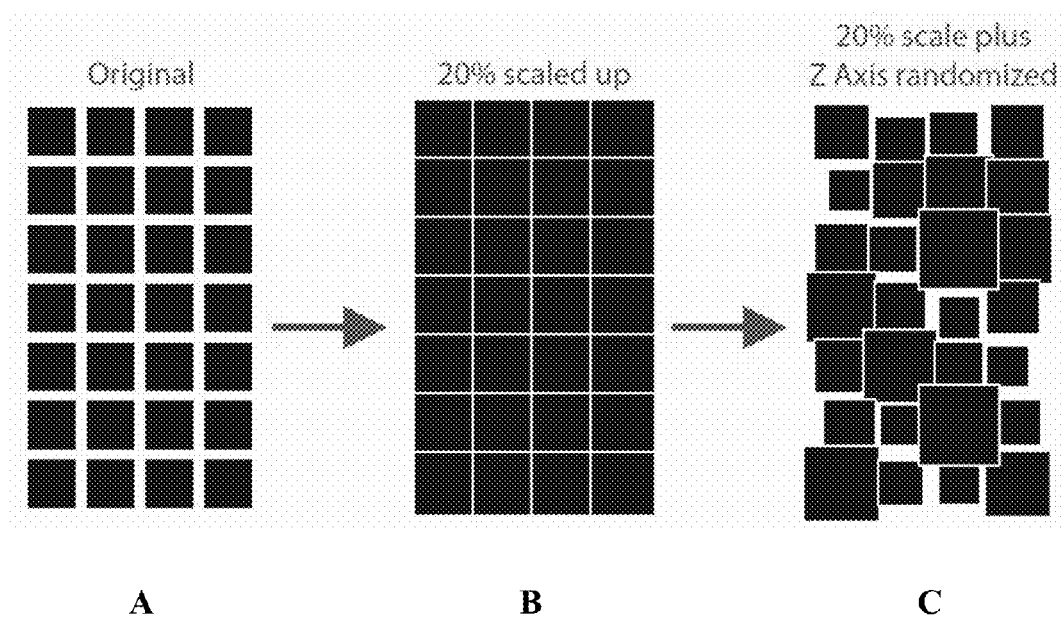
FIG. 3 shows a non-limiting example of a schema for creating a three-dimensional list of items; in this case, a schema involving starting with a two-dimensional list (A), scaling the items (B) and randomizing (or alternatively, hierarchically arranging) the z-axis position of the items (C).

Referring to FIGS. 3A, 3B, and 3C, in a particular embodiment, a two-dimensional list of items is processed to render a three-dimensional list of items. In FIG. 3A, the items are arranged relative to each other in the X and Y axes to create a two-dimensional grid. In FIG. 3B, the items are scaled up by 20%. In FIG. 3C, the items are randomized on the Z axis to create a three-dimensional array configuration. Alternatively, the items are arranged hierarchically on the Z axis to create a three-dimensional array configuration.

Referring to FIG. 4A, in a particular embodiment, a user manipulates a three dimensional list of photographs, using the gyroscopic navigation mode described herein, to pitch the list away from the user's vantage point at the top and toward the user's vantage point at the bottom. In this embodiment, the user applies the gyroscopic navigation mode described herein to scroll through the list of items.

Referring to FIG. 4B, in a particular embodiment, a user manipulates a three dimensional list of photographs, using the gyroscopic navigation mode described herein, to pitch the list away from the user's vantage point at the bottom and toward the user's vantage point at the top. In this embodiment, the user applies the gyroscopic navigation mode described herein to scroll through the list of items.

Referring to FIGS. 4C and 4D, in a particular embodiment, a user manipulates a three dimensional list of photographs, using the joystick navigation mode described herein, to pitch and roll the list clockwise relative to the user's vantage point and to scroll through the list of items.

Referring to FIGS. 5A-5D, in a particular embodiment, a user selects a particular item from a list of items, which triggers the application to present an isolated, enlarged version of the selected item.

Figure 6:
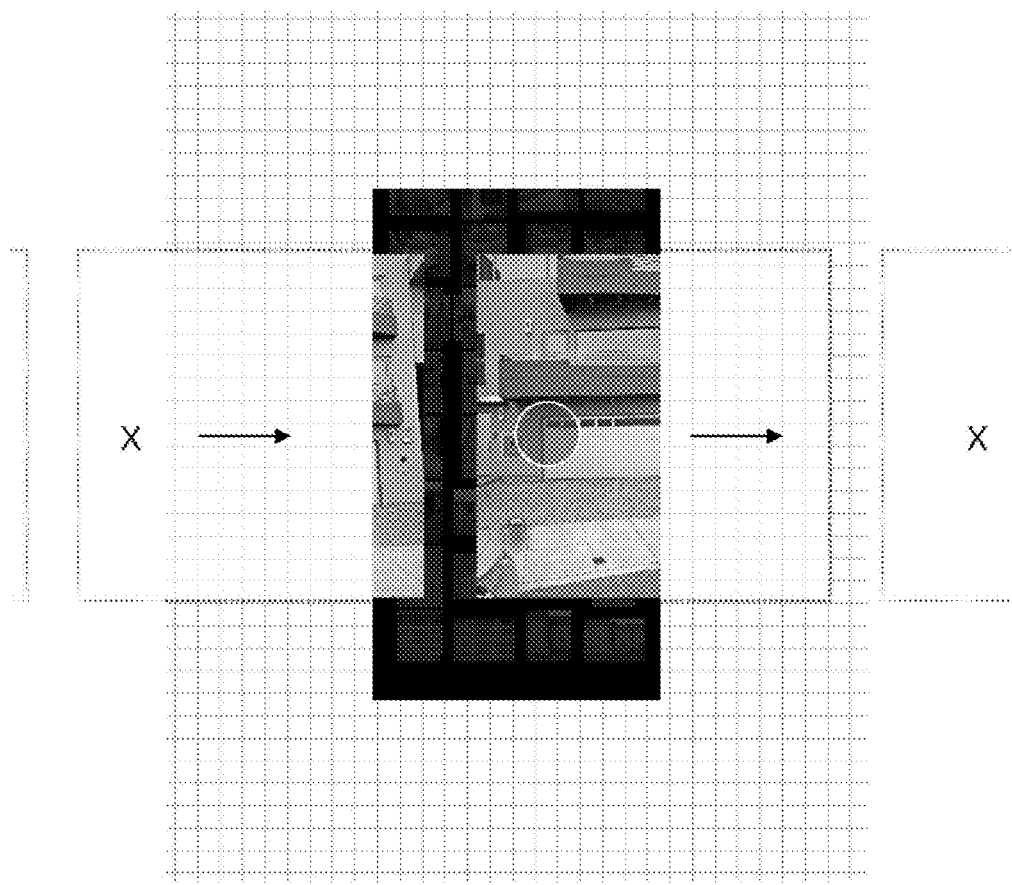
FIG. 6 shows a non-limiting example of a navigable, two-dimensional list of items; in this case, a list offering the ability to present an isolated and enlarged version of a selected item and offering the ability to horizontally scroll through the enlarged versions of items of the list (the user is scrolling through the items from the right of the device to the left).

Referring to FIG. 6, in a particular embodiment, where a user has selected an item, interacting with the selected item (e.g., by horizontal swiping or tapping a touchscreen, by gyroscopically-controlled navigation, etc.) triggers the application to scroll through the underlying list of items in the isolated, enlarged view.

Navigation Modes

In some embodiments, the systems, media, and methods disclosed herein include a plurality of navigation modes. In further embodiments, one or more navigation modes are used to navigate the items in the list of items. In still further embodiments, one or more navigation modes are used to manipulate the list of items itself. In still further embodiments, one or more navigation modes are used to select one or more items from the list of items. In still further embodiments, one or more navigation modes are used to activate or manipulate the item details and/or item options. In still further embodiments, one or more navigation modes are used to activate or manipulate the administrative menu. In various embodiments, the systems, media, and methods disclosed herein include 3, 4, 5, 6, 7, 8, 9, 10 or more navigation modes. A distinguishing feature of the subject matter described herein is the availability of at least three navigation modes. A variety of navigation modes are suitable.

In some embodiments, the systems, media, and methods disclosed herein include a touch scroll and rotation navigation mode. In further embodiments, a touch navigation mode allows a user to navigate (e.g., browse, traverse, select, etc.) the items in the navigable list of items. In still further embodiments, in a touch navigation mode, a user optionally swipes or flicks on the list using a touchscreen of the device to navigate. In some embodiments, a user optionally, swipes or flicks vertically to scroll the list of items. In further embodiments, where the menu is in a three-dimensional configuration, the user optionally, swipes or flicks horizontally (or taps, double taps, or taps and holds) to rotate the menu itself. In some embodiments, where a gravity option is active, the menu scrolls and/or rotates with the configured inertial effects.

In some embodiments, the systems, media, and methods disclosed herein include a joystick scroll and rotation navigation mode. A joystick navigation mode includes a joystick graphical user interface element that is optionally manipulated by a user via a touchscreen of a device. In some embodiments, the joystick graphical user interface element includes a neutral point and user input is achieved by touching and dragging the element in a direction and in a distance from the neutral point. In further embodiments, a joystick navigation mode allows a user to navigate (e.g., browse, traverse, select, etc.) the items in the navigable list of items. In still further embodiments, in a joystick navigation mode, a user optionally presses and drags on a joystick graphical user interface element using a touchscreen of the device to navigate. In some embodiments, a user optionally, drags vertically to scroll the list of items. In further embodiments, where the menu is in a three-dimensional configuration, the user optionally, drags horizontally to rotate the menu itself. In some embodiments, where a gravity option is active, the menu scrolls and/or rotates with the configured inertial effects. Many forms are suitable to graphically represent a joystick interface. For example, in a particular embodiment, a joystick interface is suitably represented by a small geometric graphic such as a sphere.

In some embodiments, a joystick graphical user interface element is modal. In further embodiments, in one mode the joystick allows the user to display and manipulate an administrative menu. In still further embodiments, in another mode the joystick allows the user to navigate the list of items, select items, and manipulate the list with yaw, pitch, and roll control. By way of example, where the list of items is a 2D list, touching and dragging the joystick element up pushes the list up and touching and dragging the joystick element down, pushes the list down. By way of further example, where the list of items is a 3D list, touching and dragging the joystick element will yaw, pitch and roll the list as well as push it right or left. In yet further embodiments, the joystick, in the second mode, allows the user to reset the calibration point of the gyroscope of the processing device by, for example, double tapping on the joystick element.

Figure 8:
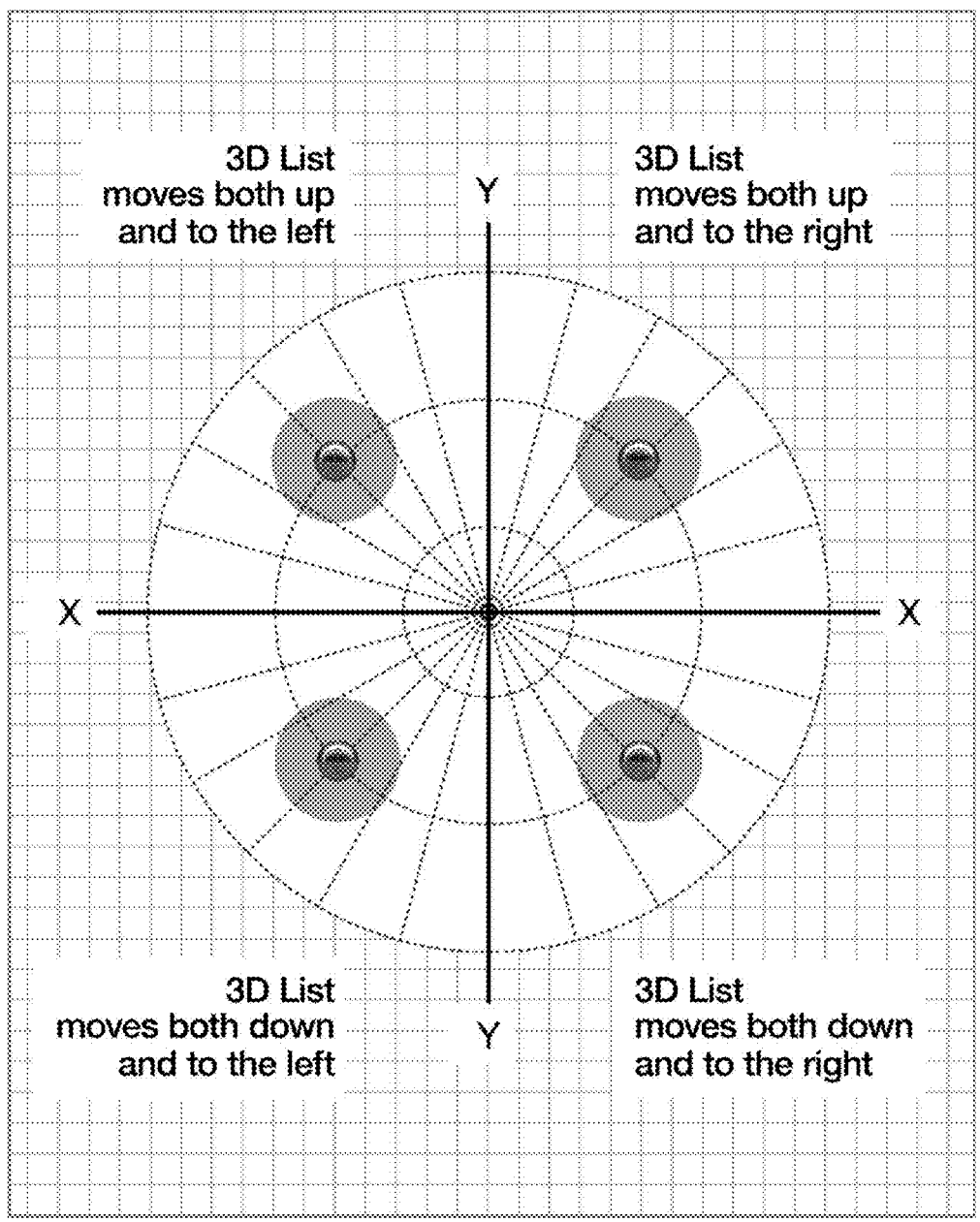
FIG. 8 shows a non-limiting example of a schema for joystick navigation; in this case, a schema for using a joystick user interface input control to navigate a list of items described herein.

Referring to FIG. 8, in a particular embodiment, a joystick graphical user interface element is represented in the form of a small sphere. In this embodiment, moving the element into the upper left quadrant triggers the application to move the list of items both up and to the left, moving the element into the upper right quadrant triggers the application to move the list of items both up and to the right, moving the element into the lower left quadrant triggers the application to move the list of items both down and to the left, and moving the element into the lower right quadrant triggers the application to move the list of items both down and to the right.

In some embodiments, the systems, media, and methods disclosed herein include a gyroscopic scroll and rotation navigation mode. In further embodiments, a gyroscopic navigation mode allows a user to navigate (e.g., browse, traverse, select, etc.) the items in the navigable list of items. In still further embodiments, in a gyroscopic navigation mode, a user optionally rotates the device to navigate. In some embodiments, a user optionally, rotates the device on a horizontal axis to scroll the list of items. In further embodiments, where the menu is in a three-dimensional configuration, the user optionally, rotates the device on a vertical axis to rotate the menu itself. In some embodiments, where a gravity option is active, the menu scrolls and/or rotates with the configured inertial effects.

In some embodiments, a gyroscopic navigation mode allows a user to play one or more videos (or video previews) forward or backwards at variable speeds, by pitching or rolling the device, depending on the degree of rotation of the device.

Item Details and Options

In some embodiments, the systems, media, and methods disclosed herein include an interface for presenting item details. In further embodiments, the item details comprise information associated with or pertaining to a particular item selected from the list of items. In still further embodiments, the item details comprise metadata associated with the item, such as EXIF data. In some embodiments, a user interacts with an item in the list of items to select the item and further interacts with the selected item to trigger the application to present the item details.

In some embodiments, the systems, media, and methods disclosed herein include an interface for presenting item options. In further embodiments, the item options comprise software functions associated with or pertaining to a particular item selected from the list of items. In some embodiments, a user interacts with an item in the list of items to select the item and further interacts with the selected item to trigger the application to present the item options. Many item options are suitable. By way of example, suitable item options include opening one or more selected items in an appropriate viewer or player application (e.g., video player, audio player, webpage viewer, 3D model viewer, text viewer, graphics viewer, etc.). By way of further example, suitable item options include opening one or more selected items in an appropriate editor application (e.g., video editor, audio editor, webpage editor, 3D model editor, text editor, graphics editor, etc.).

Referring to FIG. 7, in a particular embodiment, where a user has selected a photograph, interacting with the selected photograph (e.g., by vertical swiping or tapping a touchscreen, etc.) triggers the application to present item details and options. In this embodiment, the details and options are presented via a rotating, three-dimensional, geometric interface. In this embodiment, rotation of the interface is optionally achieved by a user rotating the device (e.g., gyroscopic navigation), by a user vertically swiping the interface (e.g., touchscreen navigation), and/or by a user manipulating a joystick control (e.g., joystick navigation). Further, in this embodiment, upon user interaction with a selected photograph, item details are presented including, for example, exposure mode, brightness value, focal length, date/time stamp, flash information, metering mode, white balance, scene capture type, sharpness, sensing method, and make/model of capturing device. Still further, in this embodiment, upon user interaction with a selected photograph, item options are presented including, for example, sharing via text message, email, social media and the like, deleting from the list, marking as a favorite, applying a visual effect, theme, and/or look, and accessing further options such as adding the item to a collection.

Referring to FIG. 7, FIGS. 7A-7D illustrate an embodiment including presentation of item details and options on a three-dimensional geometric object, wherein the item is presented on a first surface and the item details and options are presented on a second surface of the object. In this embodiment, the three-dimensional geometric object rotates upon user interaction to present the item details and options. FIGS. 7A-7D show non-limiting representative stages of the rotation.

Administrative Menu

In some embodiments, the systems, media, and methods disclosed herein include an administrative menu. In further embodiments, the administrative menu is comprised of a combination of buttons, controllers, settings, and adjustments that display on the processing device (e.g., a mobile phone or wearable device) within a simulated multi-dimensional, three-dimensional (X-, Y-, and Z-axis) and or two dimensional (X-Y) space. In further embodiments, a user controls and positions the menu based on gyroscopic, accelerometer, and GPS data. In still further embodiments, the administrative menu is a gyroscopically-controlled menu.

For example, in some embodiments, rotation (yaw, pitch, and roll) of the mobile or wearable device (working separately or in unison), as well as X-, Y-, and Z-axis placement, positions the menu closer to the users preferred digit (finger or thumb). In such embodiments, the described subject matter solves the problems presented by using a device with a large touchscreen one-handedly; the user is thus provided the ability to navigate one-handed with efficiency on various screen form factors, large and small. In some embodiments, the menu items are stacked in the Z-axis to present menu items in an organized hierarchical display matrix. In further embodiments, the most relevant items are presented closest to the user in the Z-axis.

In further embodiments, an administrative menu described herein allows a user to configure the properties and characteristics of the application. By way of example, in some embodiments, the administrative menu allows the user to configure the source of the items in the list of items. In various embodiments, the administrative menu offers options for the source of the items comprising local storage and/or remote storage such as social media platforms, media sharing platforms, and/or cloud storage systems.

By further way of example, in some embodiments, the administrative menu allows the user to configure whether the application is in a two-dimensional, three-dimensional mode, or four-dimensional (including three spatial dimensions as well as changes over time). The list of items is presented as a two-dimensional, three-dimensional, or four-dimensional list as described herein based on the application mode. In further embodiments, the administrative menu allows the user to toggle between two- and three-dimensional presentations of the list of items.

By further way of example, in some embodiments, the administrative menu allows the user to configure the interactive properties of the list such as virtual gravity and inertial properties. In further embodiments, such interactive properties affect the motion and behavior of the list of items in response to user interaction via the navigational modes described herein. In still further embodiments, the administrative menu allows the user to reset the pivot point for gravity effects.

In some embodiments, the application includes a joystick graphical user interface element. In further embodiments, the joystick graphical user interface element is modal with a mode wherein use of the joystick allows the user to display the administrative menu. For example, in some embodiments, a user taps the joystick control once to activate the administrative menu. In still further embodiments, the joystick graphical user interface element also has a mode wherein use of the joystick allows the user to navigate the list of items and manipulate the yaw, pitch, and roll of the list itself.

Referring to FIG. 9, in a particular embodiment, a user has activated the administrative menu by interacting with the joystick control. In this embodiment, the menu is presented via a rotating, three-dimensional, geometric interface. A user optionally toggles the three-dimensional property of the list of items off/on. FIGS. 9A and 9B illustrate an administrative menu with the three-dimensional property off. FIGS. 9C and 9D illustrate an administrative menu with the three-dimensional property on. A user optionally toggles the gravity property of the list of items off/on. FIGS. 9A and 9C illustrate an administrative menu with the gravity property off. FIGS. 9B and 9D illustrate an administrative menu with the gravity property on. In this embodiment, where the gravity property of the list of items is on, the user optionally uses the administrative menu to reset the zero point for the gyroscope of the device.

Figure 10:
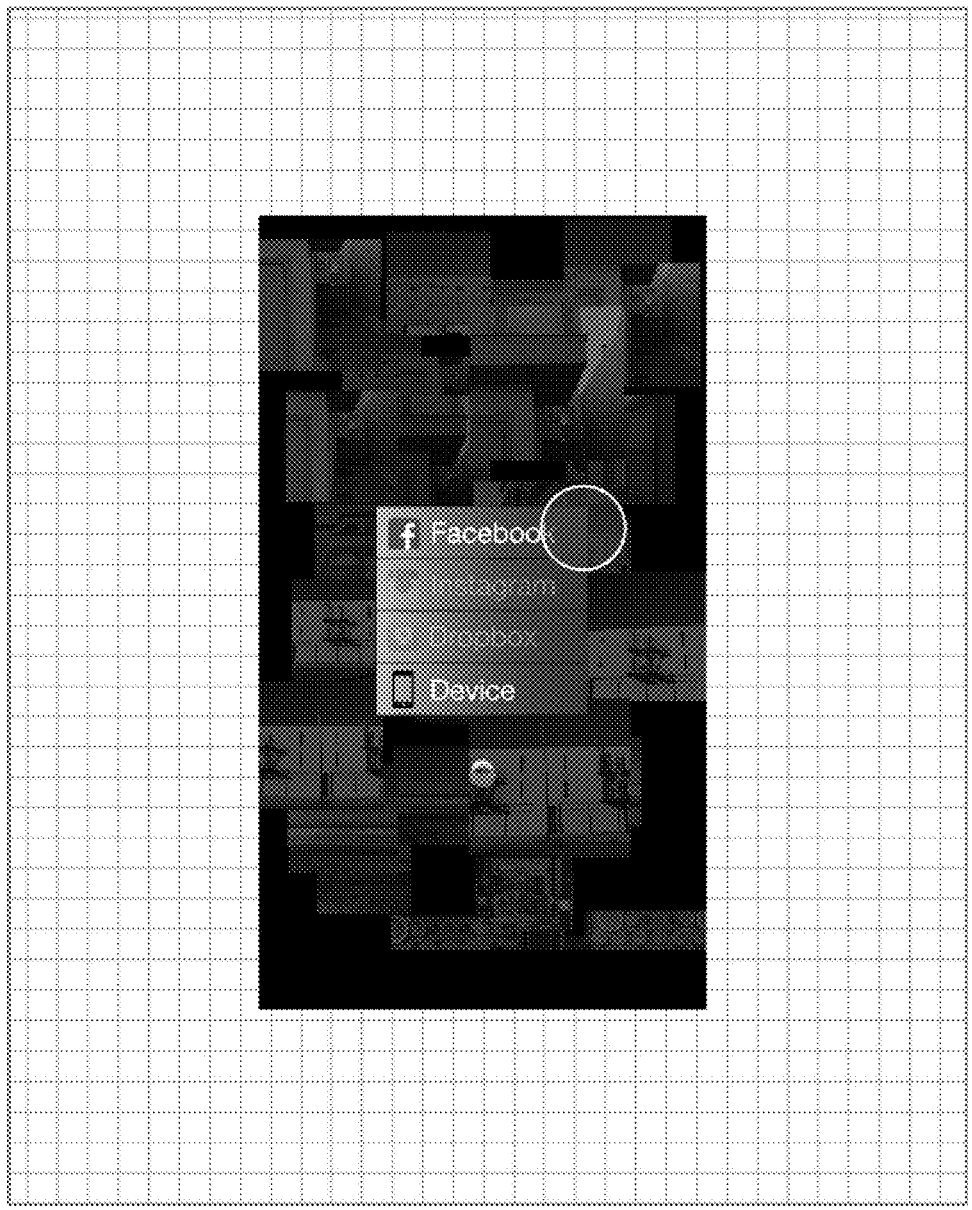
FIG. 10 shows a non-limiting example of an administrative menu; in this case, an administrative menu allowing selection of local or various remote sources for the items or the list of items.

Referring to FIG. 10, in a particular embodiment, the administrative menu allows the user to configure the source(s) for the items to be displayed in the list of items. In this embodiment, the menu offers options for local device storage as well as social media platforms, photo sharing platforms, and cloud storage services.

Figure 11:
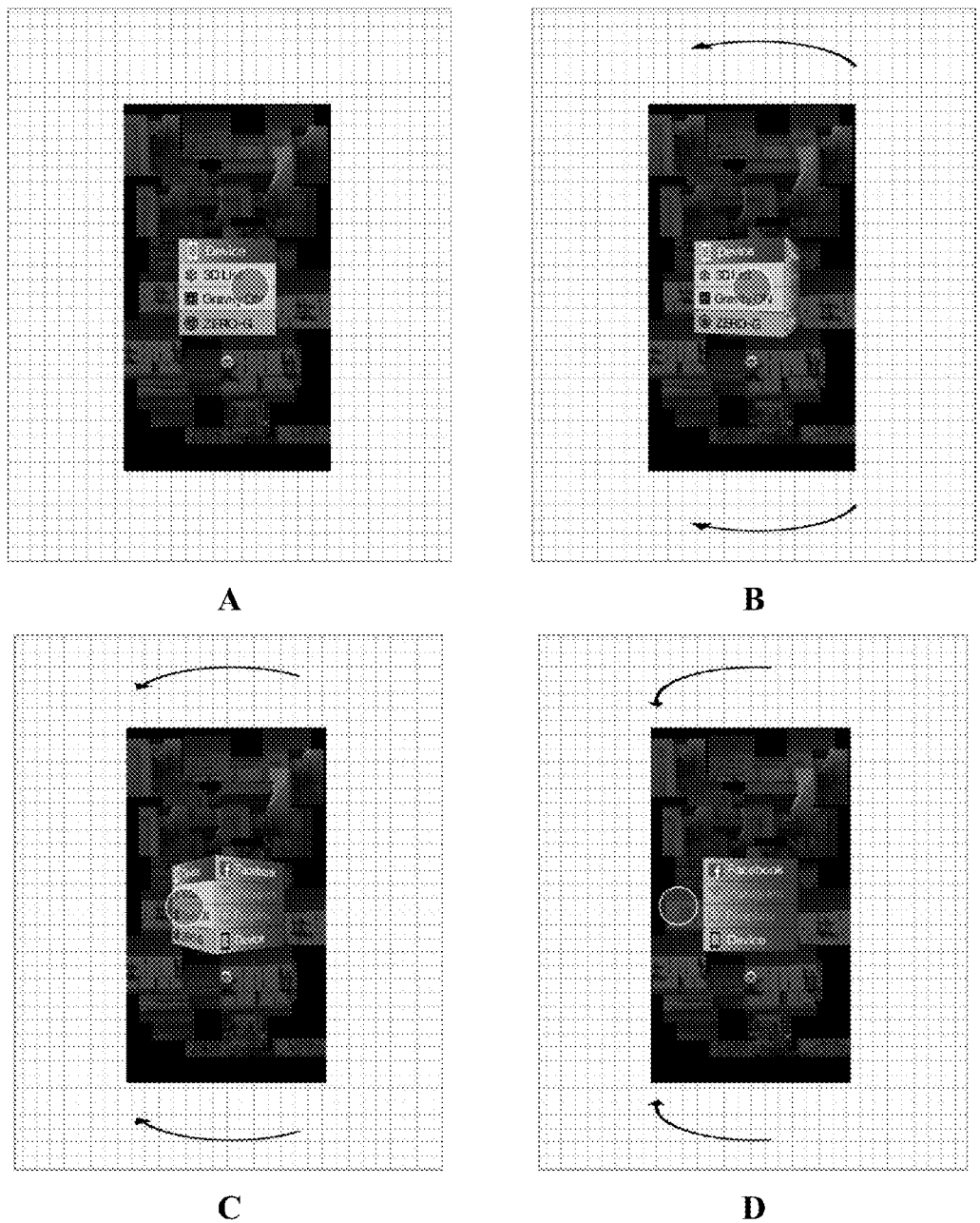
FIG. 11 shows a non-limiting example of an administrative menu; in this case, an administrative menu presented on a rotating geometric menu (A-D), wherein a top-level menu is presented on a first surface (A and B) and a sub-menu is presented on a second surface (C and D).

Referring to FIG. 11, in a particular embodiment, the administrative menu is presented via a rotating, three-dimensional, geometric interface. In this embodiment, rotation of the interface is optionally achieved by a user rotating the device (e.g., gyroscopic navigation), by a user horizontally swiping the interface (e.g., touchscreen navigation), and/or by a user manipulating a joystick control (e.g., joystick navigation). Further, in this embodiment, selection of a menu option triggers the application to rotate the geometric interface to reveal sub-options. In this embodiment, the three-dimensional geometric object rotates upon user interaction to present options and sub-menus associated with the administrative menu. FIGS. 11A-11D show non-limiting representative stages of the rotation.

Figure 12:
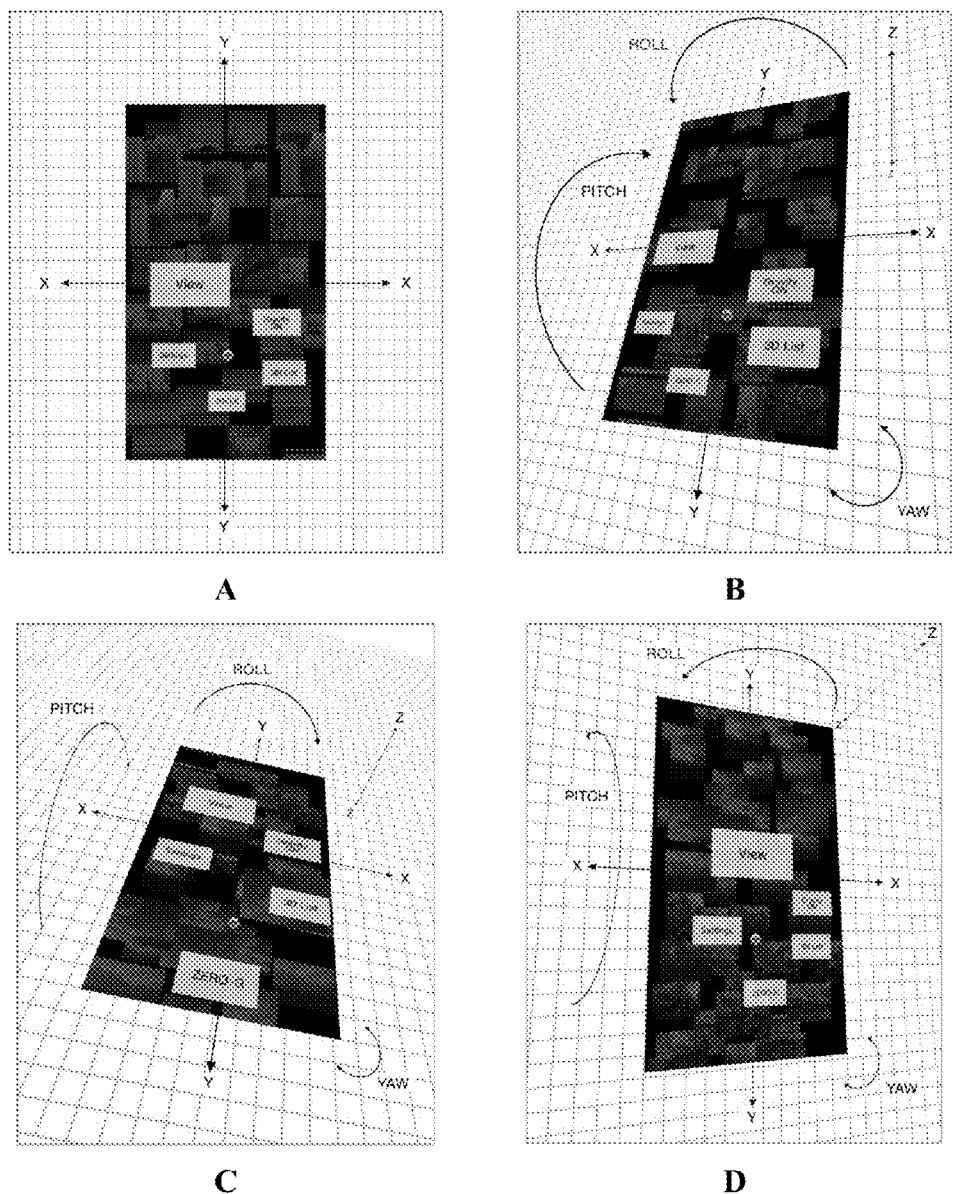
FIG. 12 shows a non-limiting example of an administrative menu; in this case, an administrative menu allowing configuration of the source of the items in the list, 2D or 3D presentation of the items, gravity off or on, and re-zeroing the pivot point for the gravity effect, wherein the menu is optionally gyroscopically controlled in multiple dimensions (A-D).

Referring to FIG. 12, in a particular embodiment, administrative menu is displayed on a plurality of three-dimensional objects optionally gyroscopically manipulable in three-dimensions as a single unit (see A-D showing various, non-limiting orientations achievable). In this embodiment, three-dimensional manipulation of the administrative menu allows a user to easily traverse large and complex menus using a touchscreen by using gyroscopic three-dimensional manipulation of the menu to bring particular menu options closer to the user's thumb or finger. In such embodiments, the reach of the user's digit is effectively extended to facilitate use of the menu on a device with a large touchscreen.

Continuing to refer to FIG. 12, in a particular embodiment, the menu includes interface elements allowing the user to view or play selected items, including collections of items, shuffle the list of items, toggle a 3D view of the list of items, toggle gravity effects, and reset the zero point for the gyroscope of the device. In this embodiment, the menu is activated (e.g., opened) and deactivated (e.g., closed) by interacting (e.g., tapping, double tapping, etc.) with the joystick interface element.

Referring to FIGS. 13A and B, in a particular embodiment, the administrative menu of FIG. 12 includes a "view/play" button for observing one or more selected items (e.g., a collection). In this embodiment, the "view/play" button activates a sub-menu, which includes interface elements allowing the user to shuffle music associated with the items, shuffle the items, view each of the items individually (with preview), export the series of items as a video or slideshow, and share the items via a social platform (e.g., YouTube, Instagram, Vine, Vimeo, etc.).

Referring to FIGS. 13C and D, in a particular embodiment, the administrative menu of FIG. 12 includes a "settings" button for gaining access to application configuration settings. In this embodiment, the "settings" button activates a sub-menu, which includes interface elements allowing the user to configure the gyroscopic response, screen sleep, menu fade, and photo opening characteristics.

Looks

In some embodiments, the systems, media, and methods disclosed herein include features for adding, removing, and/or editing looks, or use of the same. In further embodiments, looks are real-time gyroscopically-controlled visual effects, including, by way of non-limiting examples, colored lighting, lens flares, atmospherics, environmental elements, background textures, graphical overlays (such as type), design elements, stickers, and the like.

In some embodiments, looks are optionally applied to the list of items. In further embodiments, looks are optionally applied in real-time, while viewing a list of items. In some embodiments, looks are optionally applied to shared and/or sharable lists. In some embodiments, looks are optionally applied to collections. In some embodiments, looks are optionally applied to one or more items in the list of items.

Audio

In some embodiments, the systems, media, and methods disclosed herein include tools for adding, removing, and/or configuring audio, or use of the same. In further embodiments, the audio is real-time gyroscopically-controlled music and audio effects activated, by way of non-limiting examples, by navigating a list, by selecting an item, by viewing items details and/or options, by creating a collection, and the like.

Many audio effects are suitable including, by way of non-limiting examples, left/right panning, instrument change, volume change, audio mixing, sound design, musical flourishes, and the like.

In some embodiments, audio optionally applied to the list of items. In further embodiments, audio is optionally applied in real-time, while viewing a list of items. In some embodiments, audio is optionally applied to shared and/or sharable lists. In some embodiments, audio is optionally applied to collections. In some embodiments, audio is optionally applied to one or more items in the list of items.

In some embodiments, a voice annotation is optionally captured live during video recording while navigating a list or by adding a voice annotation to a previously recorded live video capture.

Haptic Feedback

In some embodiments, the systems, media, and methods disclosed herein include haptic user feedback, or use of the same. Haptic feedback is suitably provided in response to (or a part of) many types of user interactions with the application. By way of non-limiting examples, haptic user feedback is suitably provided when a user navigates the list of items, selects one or more items, views item details and/or options, adds an item to a collection, and the like. In further embodiments, the haptic feedback is triggered, for example, by gyroscopically-controlled roll/speed while the user is actively browsing the list of items or a selected item via the picture viewer. In still further embodiments, haptic feedback guides the user in magnetic centering and effects the way the user engages with location data.

Collections

In some embodiments, the systems, media, and methods disclosed herein include tools to select one or more items from the navigable list of items to form a collection of items (e.g., a secondary list of items, a sub-list of items, etc.). For example, in a particular embodiment, the systems, media, and methods disclosed herein include a stage. In such embodiments, the stage is a secondary virtual display to the right or left of the list of items, wherein the user optionally selects one or more items from the list of items and slides the selection(s) onto the stage, thus creating a collection. In some embodiments, the collection is optionally manipulated in the same ways the list of items is optionally manipulated (and independently of the list of items) by, for example, X-, Y-, and/or Z-axis repositioning, type, looks, graphics and/or stickers, audio, and the like.

In some embodiments, adding visual content to the stage, by, for example, selecting visual content from the navigable list of items and sliding it to the stage, allows the user build a collection. The visual content is optionally sourced from one or more local sources (e.g., the local device), one or more remote sources (e.g., the cloud), or a combination of local and remote sources.

In some embodiments, a voice annotation is optionally captured live during creation of a collection or by adding a voice annotation to a previously created collection.

In some embodiments, the systems, media, and methods disclosed herein include features to facilitate collaboration between a plurality of users, or use of the same. In further embodiments, a collection is created for the purposes of collaboration. Many forms of collaboration are suitable. In some embodiments, a user shares a collection with collaborators. In such embodiments, sharing allows collaborators to, for example, add items to the collection, remove items from the collection, rank, order, or prioritize items in the collection, further share the collection, and the like. In some embodiments, a user also has the option to share the collection with collaboration turned off. When collaboration is turned off the collection is set up for consumption only. In some embodiments, properties of the collection, such as creative settings (e.g., X-, Y-, and Z-axis repositioning, type, looks, graphics and/or stickers, audio, and the like) are controlled by the original creator. In other embodiments, properties of the collection are optionally manipulated by users with whom the collection is shared.

In some embodiments, a user has the option to export a collection as a linear video file. In further embodiments, a collection exported as a linear video file is optionally shared, for example, via one or more social and/or video sharing platforms. In some embodiments, a user has the option to save a collection in an application native format, by way of non-limiting examples, to the local device, to a proprietary cloud system, and/or to third-party cloud storage services (e.g., DropBox, Box, etc.).

Referring to FIGS. 14A and B, in a particular embodiment, a user selects (e.g., by touchscreen, etc.) one item in the list of items (A) or a plurality of items (B) to identify the selected items for inclusion in a collection.

Referring to FIGS. 14C and D, in a particular embodiment, selected items identified for inclusion in a collection are isolated by sliding them from the list (e.g., to a stage, etc.) to form the collection.

Video Output

In some embodiments, the systems, media, and methods disclosed herein include features to record video, or use of the same. In some embodiments, the systems, media, and methods disclosed herein include features to record screen capture video documenting and/or demonstrating use of the list of items and other features disclosed. For example, a user optionally uses the video recording feature to tell a linear runtime story in realtime while the app is screen recording. In this example, the user is serving as a live VJ to story tell via use of the list of items that he/she can record and share as a non-linear movie.

In further embodiments, the systems, media, and methods disclosed herein include features to export recorded video, or use of the same. Many video formats are suitable including, by way of non-limiting examples, Windows® Media Video (WMV), Windows® Media®, Motion Picture Experts Group (MPEG), Audio Video Interleave (AVI), Apple® QuickTime®, RealMedia®, Flash Video, Motion JPEG (M-JPEG), WebM, Advanced Video Coding High Definition (AVCHD), Ogg Video, Vob, MV4, MP4, 3GPP, 3GPP2, and the like.

Ads

In some embodiments, the systems, media, and methods disclosed herein include advertising, upgrades, and/or feature add-ons, e.g., placement of ad units. For example, in some embodiments, advertising is optionally displayed within the list of items. In further embodiments, the advertising is for the products and services of sponsors paying to have ads displayed within the list. In still further embodiments, ad, upgrade, and/or feature add-on placement is determined by Z-axis proximity. For example, the closer the placement is to the viewer (in z-axis), the higher the fees for placement.

In some embodiments, the advertising, upgrade, and/or feature add-on is placed as an item in the list of items. In other embodiments, the advertising, upgrade, and/or feature add-on does not comprise a menu item. In some embodiments, ads, upgrades, and/or feature add-ons, are placed in the list with a position determined algorithmically. In further embodiments, factors used to determine the positioning of the ads, upgrades, and/or feature add-ons are, for example, subject matter, neighboring colors, image composition, location, and people, or some other metadata criteria. In some embodiments, ads are placed in the list with a frequency determined algorithmically.

Processing Device

In some embodiments, the systems, media, and methods described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In some embodiments, the digital processing device includes one or more sensors. In some embodiments, the processing device includes an accelerometer. In further embodiments, an accelerometer is used to detect the orientation of the device by tracking linear acceleration. In some embodiments, the processing device includes a gyroscope. In further embodiments, a gyroscope is used to detect the orientation of the device by tracking angular rotational velocity. In some embodiments, the processing device includes a digital compass. In some embodiments, the processing device includes a barometer.

In some embodiments, the digital processing device includes a geolocation element. Geolocation is the identification of the real-world geographic location of an object, such as a handheld computer, mobile smartphone, or a portable computing device such as a laptop or tablet computer. A location is suitably expressed in a number of ways including, by way of non-limiting examples, geographic coordinates (e.g., latitude and longitude), a place name (e.g., county, city, landmark, intersection, etc.), a physical street address, distance from a given location, presence within a specified radius from a given location, and a graphical depiction on a map. In some cases, geolocation involves geocoding to find associated latitude and longitude from other geographic data. In some cases, geolocation involves reverse geocoding to back code latitude and longitude coordinates to a readable address or place name.

Many methods of geolocation are suitable that utilize several underlying sources of location information. In some embodiments, a software module geolocates, for example, a user or a mobile processing device using sources of location information including, by way of non-limiting examples, GPS coordinates provided by a processing device, triangulation between mobile phone towers and public masts (e.g., assistive GPS), Wi-Fi connection location, WHOIS performed on IP address or MAC address (e.g., WiFi base station MAC address), GSM/CDMA cell IDs (e.g., identification, triangulation, and multilateration), and location information self-reported by a user. In some embodiments, location information includes position (e.g., latitude and longitude), elevation, heading, speed, orientation, and combinations thereof.

In some embodiments, a software module geolocates, for example, a user or a mobile processing device using the HTML 5 geolocation API. In light of the disclosure provided herein, those of skill in the art will recognize that the HTML 5 geolocation API is supported in Internet Explorer 9.0+, Firefox 3.5+, Safari 5.0+, Chrome 5.0+, Opera 10.6+, iOS 3.0+, Android 2.0+, and Windows Phone 7.5+. In some embodiments, a software module geolocates, for example, a news event or a contributor using methods aligned with W3C Geolocation API (available at: http://dev.w3.org/geo/api/spec-source.html). The W3C Geolocation API defines an interface to location information associated with a processing device (e.g., smartphone, tablet computer, laptop computer, etc.) hosting the implementation, such as latitude and longitude.

In accordance with the description herein, suitable digital processing devices include, by way of non-limiting examples, handheld computers, wearable computers, Internet appliances, mobile smartphones, tablet computers, personal digital assistants, and video game consoles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®, Oculus Rift®, Android Wear®, Apple Watch®, Google Glass®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4 ®, Sony® PSVita, Sony® Playstation Mobile, Microsoft® Xbox 360®, Microsoft Xbox One, Nintendo® Wii®, Nintendo® Wii U®, and Ouya®, Oculus Rift®, Android Wear®, Apple Watch®, Google Glass®, Sony's PS4 Virtual Reality (Project Morpheus).

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, an OLED display is a passive-matrix OLED (PMOLED) or active-matrix OLED (AMOLED) display. In some embodiments, the display is a touch screen display or multitouch screen display. In some embodiments, the display is a plasma display. In other embodiments, the display is a video projector. In some embodiments, the display is a retinal laser projection, or LED/LCD/Laser projected onto surfaces and/or particular atmospherics. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multitouch screen. In other embodiments, the input device is a microphone to capture voice or other sound input. In other embodiments, the input device is a video camera or other sensor to capture motion or visual input. In further embodiments, the input device is a Kinect®, Leap Motion®, or the like. In other embodiments, the input device is a camera or other sensor to capture user eye and/or head motion. In further embodiments, the input device is a virtual reality headset, such as Oculus Rift®, HTC Vive, Android Wear, Google Glass®, Sony's PS4 Virtual Reality (Project Morpheus). In still further embodiments, the input device is a combination of devices such as those disclosed herein.

Non-Transitory Computer Readable Storage Medium

In some embodiments, the systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, photonic crystals, and the like. In some cases, the program and instructions are permanently, substantially permanently, semi-permanently, or non-transitorily encoded on the media.

Computer Program

In some embodiments, the systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, Unity, Unreal Engine, or combinations thereof.

In some embodiments, a mobile application includes a multimedia element. In various further embodiments, a multimedia element utilizes one or more of many suitable multimedia technologies including, by way of non-limiting examples, Adobe® Flash®, HTML 5, Apple® QuickTime®, Microsoft® Silverlight®, Java™, and Unity®. In a particular embodiment, a multimedia element utilizes Unity®.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ PlayStore (Google® Play), BlackBerry® App World, Chrome WebStore, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the systems, media, and methods disclosed herein include one or more databases, or use of the same. In view of the disclosure provided herein, those of skill in the art will recognize that many databases are suitable for storage and retrieval of user, list, and item information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A computer-implemented system comprising:
   a. a processing device comprising a gyroscope, an operating system configured to perform executable instructions, and a memory;
   b. a computer program including instructions executable by the processing device to create an application comprising:
      i. a software module configured to receive information for a plurality of items;
      ii. a software module configured to utilize the information to generate a navigable multi-dimensional list of items; the items in the list of items arranged in the X-axis, Y-axis, and Z-axis based on one or more sorting factors; wherein at least one sorting factor is selected from: a characteristic of the items, metadata associated with the items, a preference of a user, a behavior of the user, or a combination thereof;
         provided that the list of items is navigable by at least three navigation modes comprising touch scroll and rotation, joystick scroll and rotation, gyroscopic scroll and rotation;
         wherein, in response to a first user interaction, the Z-axis position of a selected item is arranged to the front and the list of items presents an isolated enlarged version of the selected item;
         wherein, in response to a second user interaction, the list of items presents item details and item options for the selected item; and
      iii. a software module configured to present a joystick graphical user interface element, the joystick graphical user interface element being modal with a first mode wherein the joystick allows the user to display an administrative menu and a second mode wherein the joystick allows the user to navigate the list of items with yaw, pitch, and roll controls.

2. The system of claim 1, wherein the items comprise document files, media files, applications, icons, links, bookmarks, communications, contacts or folders, archives, or compilations of the same.

3. The system of claim 2, wherein the media files comprise photos, videos, sound files, music files, or e-books.

4. The system of claim 1, wherein the sorting factor is alphabet, chronology, location, people, file type, color, or metadata.

5. The system of claim 1, wherein the items in the list of items are randomly arranged in the Z-axis.

6. The system of claim 1, wherein the items in the list of items are hierarchically arranged in the Z-axis.

7. The system of claim 1, wherein the software module configured to receive information for a plurality of items presents an interface allowing the user to select one or more sources for the items or a list of items.

8. The system of claim 7, wherein the source is the local storage of the processing device.

9. The system of claim 7, wherein the source is a remote service.

10. The system of claim 9, wherein the remote service is a cloud computing-based service.

11. The system of claim 9, wherein the remote service is Facebook, Instagram, Twitter, Vine, Pinterest, Tumblr, LinkedIn, Dropbox, Box, Flickr, Google Drive, iCloud, Youtube, Vimeo, SkyDrive, Mega, Hightail, Imgur, Photobucket, Picasa, Reddit, 4Chan, GitHub, WhatsApp, Viber, Line, WeChat, Paper, FlipBoard, Gmail, Yahoo Mail, iCloud Mail, Facebook Messenger, Outlook, Aol Mail, Mail.com, Uber, Lyft, or Ello.

12. The system of claim 1, wherein the touch scroll and rotation comprises the user interacting with a touchscreen of processing device through drag and flick gestures applied to the list of items to vertically scroll the list and horizontally rotate the list.

13. The system of claim 1, wherein the joystick scroll and rotation comprises the user interacting with a touchscreen of processing device to manipulate a graphical joystick element to vertically scroll the list and horizontally rotate the list.

14. The system of claim 1, wherein the gyroscopic scroll and rotation comprises the user manually rotating the processing device to vertically scroll the list and manipulate the list in yaw, pitch, and roll orientations.

15. The system of claim 1, wherein the navigation modes further comprise eye tracking scroll and rotation, wherein the user vertically scrolls the list and horizontally rotates the list via eye movements.

16. The system of claim 1, wherein the navigation modes further comprise head tracking scroll and rotation, wherein the user vertically scrolls the list and horizontally rotates the list via head movements.

17. The system of claim 1, wherein the navigation modes further comprise hand gesture tracking scroll and rotation, wherein the user vertically scrolls the list and horizontally rotates the list via hand gestures.

18. The system of claim 1, wherein the navigation modes provide a parallaxed multi-dimensional display of the elements within the list.

19. The system of claim 1, wherein the item options comprise one or more selected from the group consisting of: share, delete, add to a secondary list, apply a visual effect or look, and apply audio.

20. The system of claim 1, wherein the first user interaction is selected from the group consisting of: tap, double-tap, long hold, push, pull, flick, swipe, on an item in the list of items, or a combination thereof.

21. The system of claim 1, wherein the second user interaction is selected from the group consisting of: a gyro-gesture, a touchscreen gesture, and combinations thereof.

22. The system of claim 1, wherein the administrative menu is displayed on a plurality of three-dimensional objects, the objects manipulable in three-dimensions as a single unit.

23. The system of claim 1, wherein the processing device is a mobile device and the application is a mobile application.

24. The system of claim 1, wherein the joystick, in the second mode, further allows the user to reset the calibration point of the gyroscope of the processing device.

25. The system of claim 1, wherein the application further comprises a software module configured to allow a user to select one or more items from the list of items and to associate the selected items to form a collection.

26. The system of claim 25, wherein the collection is collaborative and is shared with at least one other user who can edit the collection.

27. The system of claim 1, wherein the application further comprises a software module configured to export a video file comprising screen capture video of a user interacting with the application.

28. The system of claim 1, wherein the navigable multi-dimensional list of items is user-configurable to provide audio or haptic user feedback.

29. Non-transitory computer-readable storage media encoded with a computer program including instructions executable by a processor to create an application comprising:
   a. a software module configured to receive information for a plurality of items;
   b. a software module configured to utilize the information to generate a navigable multi-dimensional list of items; the items in the list of items arranged in the X-axis, Y-axis, and Z-axis based on one or more sorting factors; wherein at least one sorting factor is selected from: a characteristic of the items, metadata associated with the items, a preference of a user, a behavior of the user, or a combination thereof;
   provided that the list of items is navigable by at least three navigation modes comprising touch scroll and rotation, joystick scroll and rotation, gyroscopic scroll and rotation;
   wherein, in response to a first user interaction, the Z-axis position of a selected item is arranged to the front and the list of items presents an isolated enlarged version of the selected item;
   wherein, in response to a second user interaction, the list of items presents item details and item options for the selected item; and
   c. a software module configured to present a joystick graphical user interface element, the joystick graphical user interface element being modal with a first mode wherein the joystick allows the user to display an administrative menu and a second mode wherein the joystick allows the user to navigate the list of items with yaw, pitch, and roll controls.

30. A computer-implemented method for visualizing and navigating a menu system comprising:
   a. receiving, by a computer, information for a plurality of items;
   b. utilizing, by the computer, the information to generate a navigable multi-dimensional list of items; the items in the list of items arranged in the X-axis, Y-axis, and Z-axis based on one or more sorting factors; wherein at least one sorting factor is selected from: a characteristic of the items, metadata associated with the items, a preference of a user, a behavior of the user, or a combination thereof; provided that the list of items is navigable by at least three navigation modes comprising touch scroll and rotation, joystick scroll and rotation, gyroscopic scroll and rotation;
   c. presenting, by the computer, in response to a first user interaction, an isolated enlarged version of a selected item, wherein the Z-axis position of the selected item is arranged to the front of the list of items;
   d. presenting, by the computer, in response to a second user interaction, item details and item options for the selected item; and
   e. presenting, by the computer, a joystick graphical user interface element, the joystick graphical user interface element being modal with a first mode wherein the joystick allows the user to display an administrative menu and a second mode wherein the joystick allows the user to navigate the list of items with yaw, pitch, and roll controls.

* * * * *